(12) United States Patent
Yabuguchi et al.

(10) Patent No.: US 10,461,674 B2
(45) Date of Patent: Oct. 29, 2019

(54) ELECTRIC WORKING MACHINE, AND METHOD OF DETECTING OVERLOAD OPERATION THEREOF

(71) Applicant: MAKITA CORPORATION, Anjo-shi, Aichi (JP)

(72) Inventors: Michisada Yabuguchi, Anjo (JP); Kouichi Takeda, Anjo (JP); Masumi Nishimura, Anjo (JP); Hiroshi Nojiri, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 0 days.

(21) Appl. No.: 15/670,242

(22) Filed: Aug. 7, 2017

(65) Prior Publication Data

US 2018/0048252 A1 Feb. 15, 2018

(30) Foreign Application Priority Data

Aug. 10, 2016 (JP) ................................. 2016-158028
Jan. 27, 2017 (JP) ................................. 2017-013218

(51) Int. Cl.
*H02P 6/28* (2016.01)
*H02P 6/24* (2006.01)
*H02P 6/06* (2006.01)
*H02P 29/032* (2016.01)
*B25F 5/00* (2006.01)

(52) U.S. Cl.
CPC ............... *H02P 6/28* (2016.02); *B25F 5/00* (2013.01); *H02P 6/06* (2013.01); *H02P 6/24* (2013.01); *H02P 29/032* (2016.02)

(58) Field of Classification Search
USPC .............................. 318/400.15, 400.08, 634
See application file for complete search history.

(56) References Cited

U.S. PATENT DOCUMENTS

| | | | | | |
|---|---|---|---|---|---|
| 5,729,104 | A | * | 3/1998 | Kamishima | H02H 7/0851 318/282 |
| 5,936,820 | A | * | 8/1999 | Umemura | B60L 3/0023 361/103 |
| 2003/0067507 | A1 | * | 4/2003 | Anzai | B41J 19/202 347/37 |
| 2014/0207273 | A1 | * | 7/2014 | Tsutsumi | G05B 19/4063 700/177 |
| 2016/0089759 | A1 | * | 3/2016 | Morita | B23Q 17/008 700/173 |

FOREIGN PATENT DOCUMENTS

| | | | | |
|---|---|---|---|---|
| JP | 2002-354886 A | | 12/2002 | |
| JP | 2011088268 A | * | 5/2011 | ............. H02P 29/60 |
| WO | WO-2015129358 A1 | * | 9/2015 | ............. B23D 45/16 |

* cited by examiner

Primary Examiner — Jorge L Carrasquillo
(74) Attorney, Agent, or Firm — Oliff PLC

(57) ABSTRACT

An electric working machine according to one aspect of the present disclosure comprises a motor, a speed setting unit, a load detection unit, a determination unit, and a parameter setting unit. The determination unit calculates an estimated value of a heat generation amount of the motor, and determines that the motor is in an overload operation state when the estimated value reaches a predetermined threshold. The parameter setting unit sets a parameter to be used for calculating the estimated value and/or the threshold in accordance with a rotation speed set by the speed setting unit.

19 Claims, 24 Drawing Sheets

FIRST EMBODIMENT

FIG.17A

| SPEED MODE | SETTING 1 | | SETTING 2 | | SETTING 3 | |
|---|---|---|---|---|---|---|
| | IT1 (THRESHOLD) | D1 (ADDITION VALUE) | IT2 (THRESHOLD) | D2 (ADDITION VALUE) | IT3 (THRESHOLD) | D3 (ADDITION VALUE) |
| HIGH SPEED | 18A | 30 | 17A | 20 | 16A | 10 |
| MEDIUM SPEED | 15A | 20 | 14A | 10 | 13A | 5 |
| LOW SPEED | 10A | 10 | 9A | 8 | 8A | 3 |

SECOND EMBODIMENT

FIG.17B

| SPEED MODE | SETTING 1 | | SETTING 2 | | SETTING 3 | |
|---|---|---|---|---|---|---|
| | IT1 (THRESHOLD) | D1 (ADDITION VALUE) | IT2 (THRESHOLD) | D2 (ADDITION VALUE) | IT3 (THRESHOLD) | D3 (ADDITION VALUE) |
| HIGH SPEED | 10A~18A (TRIGGER : SMALL TO LARGE) | 10~30 (TRIGGER : SMALL TO LARGE) | 9A~17A (TRIGGER : SMALL TO LARGE) | 8~20 (TRIGGER : SMALL TO LARGE) | 8A~16A (TRIGGER : SMALL TO LARGE) | 3~10 (TRIGGER : SMALL TO LARGE) |
| MEDIUM SPEED | 10A~15A (TRIGGER : SMALL TO LARGE) | 10~20 (TRIGGER : SMALL TO LARGE) | 9A~14A (TRIGGER : SMALL TO LARGE) | 8~10 (TRIGGER : SMALL TO LARGE) | 8A~13A (TRIGGER : SMALL TO LARGE) | 3~5 (TRIGGER : SMALL TO LARGE) |
| LOW SPEED | 10A~10A (TRIGGER : SMALL TO LARGE) | 10~10 (TRIGGER : SMALL TO LARGE) | 9A~9A (TRIGGER : SMALL TO LARGE) | 8~8 (TRIGGER : SMALL TO LARGE) | 8A~8A (TRIGGER : SMALL TO LARGE) | 3~3 (TRIGGER : SMALL TO LARGE) |

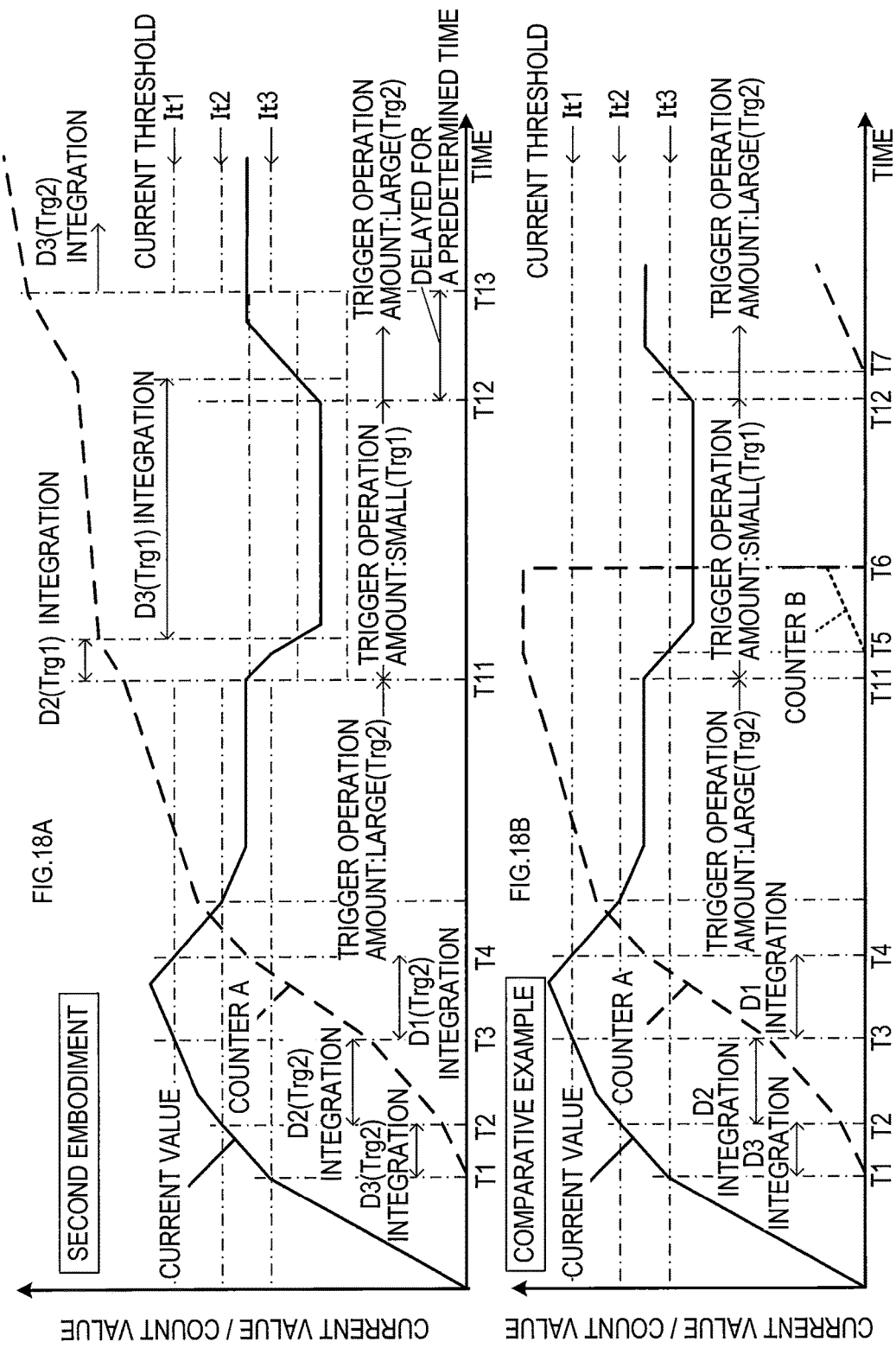

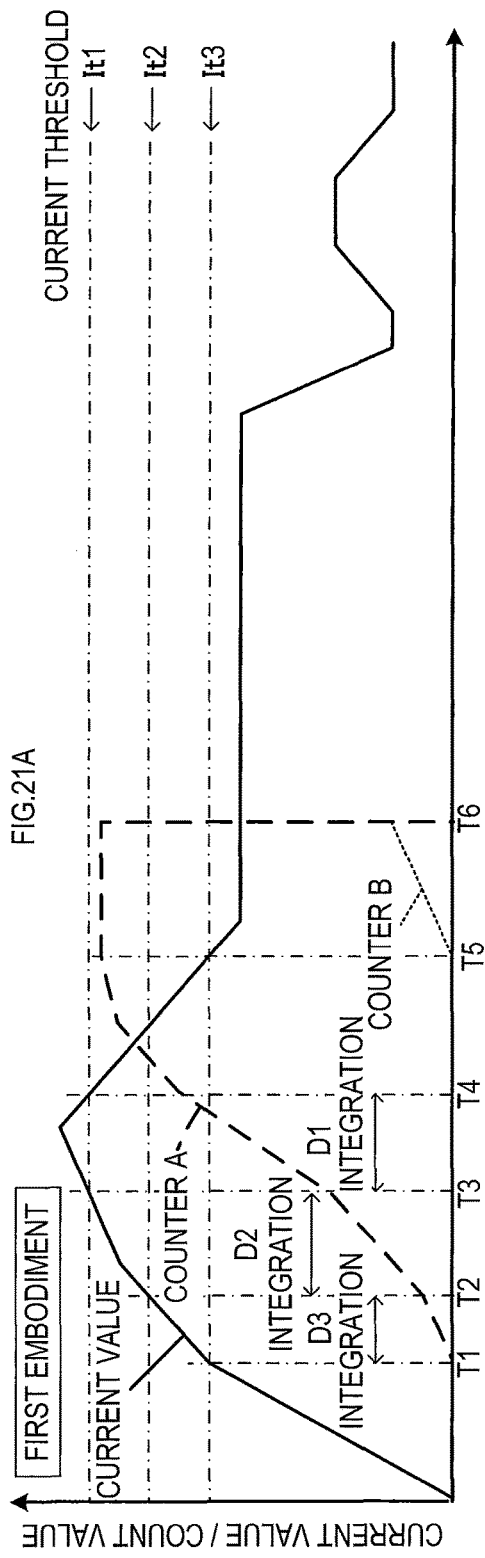
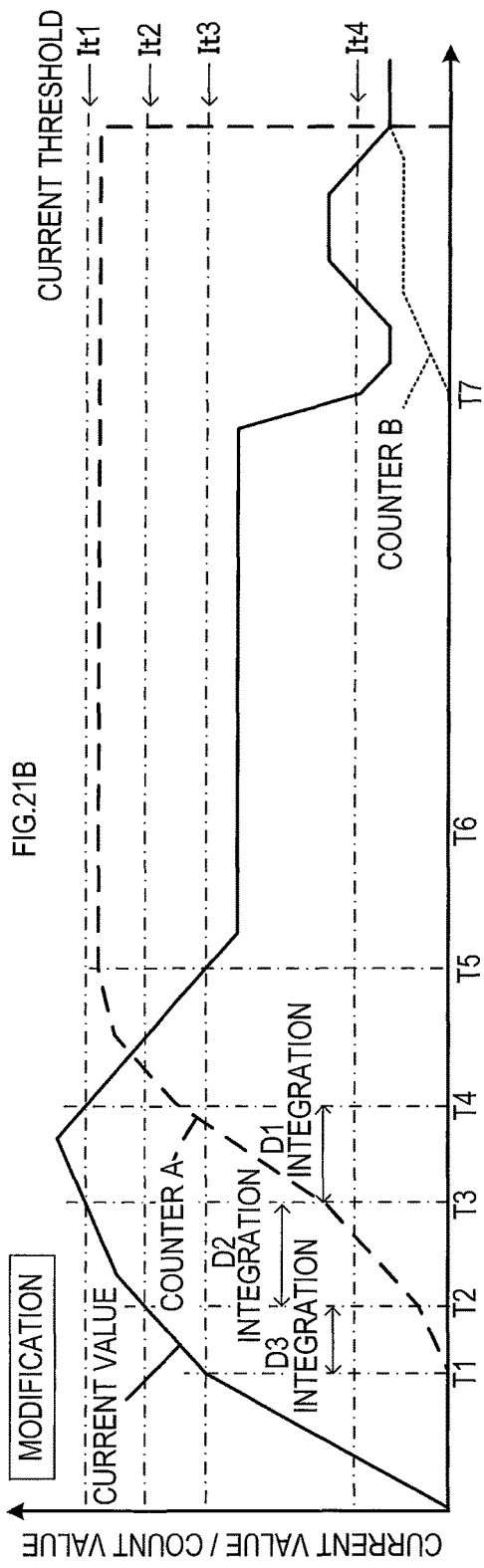
FIG.21A FIRST EMBODIMENT
FIG.21B MODIFICATION

ELECTRIC WORKING MACHINE, AND METHOD OF DETECTING OVERLOAD OPERATION THEREOF

CROSS-REFERENCE TO RELATED APPLICATIONS

This application claims the benefit of Japanese Patent Application No. 2016-158028 filed on Aug. 10, 2016 and No. 2017-013218 filed on Jan. 27, 2017 with the Japan Patent Office, the disclosures of which are incorporated herein by reference.

BACKGROUND

The present disclosure relates to detection of overload operation of an electric working machine.

In an electric working machine having a motor as a power source, the motor generates heat in accordance with the magnitude of current flowing at the time of driving the motor and a conduction time to the motor. When this heat generation amount increases, the motor deteriorates.

For this reason, Japanese Patent Application Publication No. 2002-354886 discloses an apparatus that estimates a heat storage amount (in other words, heat generation amount) of a motor from the magnitude of current flowing to the motor and a conduction time to the motor, and, when the estimated heat generation amount exceeds a set value, reduces the current flowing to the motor to protect the motor.

SUMMARY

However, in the above-described apparatus, since the heat generation amount of the motor is estimated by integrating the value of the current flowing to the motor, overload operation of the motor may not be accurately determined from the estimated heat generation amount.

In other words, as shown in FIG. 22, the temperature of a motor tends to rise when the rotation speed of the motor is low as compared to when the rotation speed of the motor is high. This is because when the motor rotates at a high speed, the motor tends to dissipate heat more than when the motor rotates at a low speed due to rotation of the motor itself.

Therefore, if the heat generation amount of the motor is estimated by the magnitude of the conduction current flowing to the motor and the conduction time, driving of the motor may be restricted even though the temperature of the motor does not reach a protection temperature (a temperature threshold shown in FIG. 22) at the time of high rotation of the motor. Desired work may not be able to be performed.

In one aspect of the present disclosure, it is desirable that overload operation of an electric working machine can be accurately detected without being affected by rotation speed of the motor.

An electric working machine in one aspect of the present disclosure comprises a motor, a speed setting unit, a load detection unit, a determination unit, and a parameter setting unit. The motor generates a driving force for driving a tool portion attached to the electric working machine. The speed setting unit sets a rotation speed of the motor. The load detection unit detects a magnitude of a load on the motor.

The determination unit calculates an estimated value of a heat generation amount of the motor from the magnitude of the load detected by the load detection unit when the motor is driven, and determines that the motor is in an overload operation state when the estimated value reaches a predetermined threshold (in other words, a value equivalent to the heat generation amount).

The parameter setting unit sets a parameter and/or the threshold to be used for calculating the estimated value in accordance with the rotation speed set by the speed setting unit.

As shown in FIG. 22, the lower the rotation speed of the motor is, the easier the temperature of the motor rises. Therefore, by considering the rotation speed of the motor as described above, the overload operation state of the motor can be detected without being affected by the rotation speed of the motor.

Therefore, according to the electric working machine of the present disclosure, not only the overload operation state of the motor can be detected from the estimated value by calculating the estimated value of the heat generation amount of the motor, but also detection accuracy of the overload operation state can be improved. Consequently, protection measures (for example, notification to a user, deceleration and stop of the motor, etc.) after detection of the overload operation state can be appropriately taken.

The electric working machine may further comprise a motor protection unit configured to stop the motor and/or decelerate the motor when the determination unit determines that the motor is in the overload operation state. Thus, when the estimated value reaches the threshold, the motor is stopped and/or decelerated, so that the motor can be protected from the overload operation state.

The parameter setting unit may be configured to set the threshold so that the threshold decreases as the operation of the motor protection unit increases.

If the threshold is set in this manner, the overload operation state can be detected more quickly when an operation to protect the motor often occurs, that is, when the temperature of the motor is rising.

Here, the parameter setting unit may be configured to set the threshold so that the estimated value rapidly reaches the threshold as the rotation speed decreases.

When the threshold is set in this manner, the overload operation state of the motor can be detected more quickly when the rotation speed is low.

Further, the parameter setting unit may be configured to set the threshold so that the threshold increases as the rotation speed increases.

If the threshold is set as such, the overload operation state of the motor can be satisfactorily detected and the motor can be protected from the overload operation state without being affected by the rotation speed of the motor.

In addition, the parameter may include a heating addition value, and the parameter setting unit may be configured to set the heating addition value so that the heating addition value increases as the rotation speed decreases. In this case, the determination unit may comprise a heating counter, and, when the magnitude of the load on the motor is higher than a predetermined set value, the determination unit may be configured to increment the heating counter using the heating addition value set by the parameter setting unit. A count value of the heating counter corresponds to the estimated value (in other words, a value equivalent to the heat generation amount).

In this way, the estimated value rapidly increases as the rotation speed of the motor decreases. Therefore, by comparing the estimated value with the threshold, the overload operation state of the motor can be quickly detected and the motor can be protected without being affected by the rotation speed of the motor.

Further, in this case, the determination unit may comprise a heat dissipation counter, and, when the magnitude of the load on the motor is lower than the set value, the determination unit may be configured to stop incrementing the heating counter and increment the heat dissipation counter using a predetermined heat dissipation addition value, and clear the count value of the heating counter when the count value of the heat dissipation counter reaches a predetermined heat dissipation determination value.

If a heat dissipation state of the motor is monitored by incrementing the heat dissipation counter as above, and the heating counter is cleared when the count value of the heat dissipation counter reaches the heat dissipation determination value, the heat generation amount of the motor can be better estimated by the heating counter.

The determination unit may be configured to clear the count value of the heat dissipation counter when the magnitude of the load on the motor is higher than the set value continuously for a longer time than a predetermined determination time.

In addition, the determination unit may be configured to increment the heat dissipation counter when the magnitude of the load on the motor is lower than a low set value that is set to be lower than the set value, and stop incrementing the heating counter and the heat dissipation counter when the magnitude of the load is between the set value and the low set value.

In this case, decreasing of the time is inhibited until when the heat dissipation counter is incremented and the heating counter is cleared during a temperature maintaining period of the motor. Therefore, the heat generation amount of the motor can be estimated more satisfactorily.

In addition, the parameter may include the set value, and the parameter setting unit may be configured to set the set value so that the set value decreases as the rotation speed decreases.

In this case, as the rotation speed of the motor decreases, the set value decreases, and the estimated value readily reaches the threshold quickly. Therefore, the overload operation state of the motor can be satisfactorily detected without being affected by the rotation speed of the motor.

The electric working machine may further comprise a control unit configured to control rotation of the motor in accordance with the rotation speed set by the speed setting unit.

In this case, the motor can be more appropriately rotated.

Further, the electric working machine may comprise a current path provided between the power source and the motor, and the load detection unit may be configured to detect a value of a motor current flowing through the current path as the magnitude of the load on the motor. The control unit may be configured to Pulse Width Modulation (PWM)-control a conduction current to the motor in accordance with the rotation speed.

In this case, the determination unit may be configured to (i) divide a value of the motor current detected by the load detection unit by a drive duty ratio of the PWM control to calculate a value of an actual current flowing to the motor, and (ii) calculate the estimated value using the value of the actual current.

In a case of detecting the value of the motor current, a resistor for current detection may be provided in the current path to detect a voltage between both ends of the resistor. When the conduction current to the motor is PWM-controlled, the value of the motor current detected on the basis of the voltage between both ends includes a value of a current flowing to the motor when a PWM signal is on, but does not include a value of a current flowing through windings inside the motor when the PWM signal is off.

Therefore, as described above, the value of the motor current detected by the load detection unit is divided by the drive duty ratio of the PWM control. Then, the value of the actual current can be detected that includes the value of the current flowing through windings of the motor when the PWM signal is off.

Therefore, by calculating the value of the actual current as such to calculate the estimated value, the estimated value can be calculated more accurately. In addition, detection accuracy of the overload operation state of the motor can be improved.

Further, the electric working machine may comprise a drive unit configured to supply power to the motor to rotate the motor.

The control unit may output a conduction command in accordance with the rotation speed to the drive unit to rotate the motor.

Further, the parameter setting unit may change the parameter and/or the threshold in synchronization with an output of the conduction command to the drive unit so that the estimated value quickly reaches the threshold as the rotation speed decreases.

Even in this case, the parameter and/or the threshold can be set in accordance with the rotation speed of the motor set by the speed setting unit.

Further, the electric working machine may comprise a cooling fan provided on a rotation shaft of the motor. In this case, since cooling air can be generated by the fan to cool the motor, heat generation due to current conduction to the motor can be inhibited. In this case, the faster the rotation of the motor is, the easier the motor is cooled. Therefore, by application of the technique of the present disclosure, the heat generation amount (and the overload operation state) of the motor can be more accurately estimated.

Another aspect of the present disclosure is a method of detecting that a motor of an electric working machine is in an overload operation state, the method comprising:
  setting a rotation speed of the motor;
  detecting a magnitude of a load on the motor;
  calculating an estimated value of a heat generation amount of the motor based on the magnitude of the load;
  determining that the motor is in the overload operation state when the estimated value reaches a predetermined threshold; and
  setting a parameter used for calculating the estimated value based on the magnitude of the load, and/or the threshold in accordance with the rotation speed.

Such method can produce the same effect as the electric working machine described above.

BRIEF DESCRIPTION OF THE DRAWINGS

Example embodiments of the present disclosure will be described hereinafter by way of example with reference to the accompanying drawings, in which.

FIG. 17A is a diagram showing a current threshold and an addition value according to the first embodiment;

FIG. 17B is a diagram showing a current threshold and an addition value according to the second embodiment;

FIG. 18A is a time chart showing a relationship between changes in motor current and a counter for estimating heating generation amount according to the second embodiment;

FIG. 18B is a time chart showing a relationship between changes in motor current and a counter for estimating heat generation amount according to a comparative example;

FIG. 21A is a time chart showing a counter A clear timing according to the first embodiment;

FIG. 21B is a time chart showing a counter A clear timing according to the modification shown in FIG. 20.

DETAILED DESCRIPTION OF THE PREFERRED EMBODIMENTS

In the present example embodiment, a case where the present disclosure is applied to a grass cutter, which is an example of an electric working machine, will be described.

First Embodiment

Figure 1:
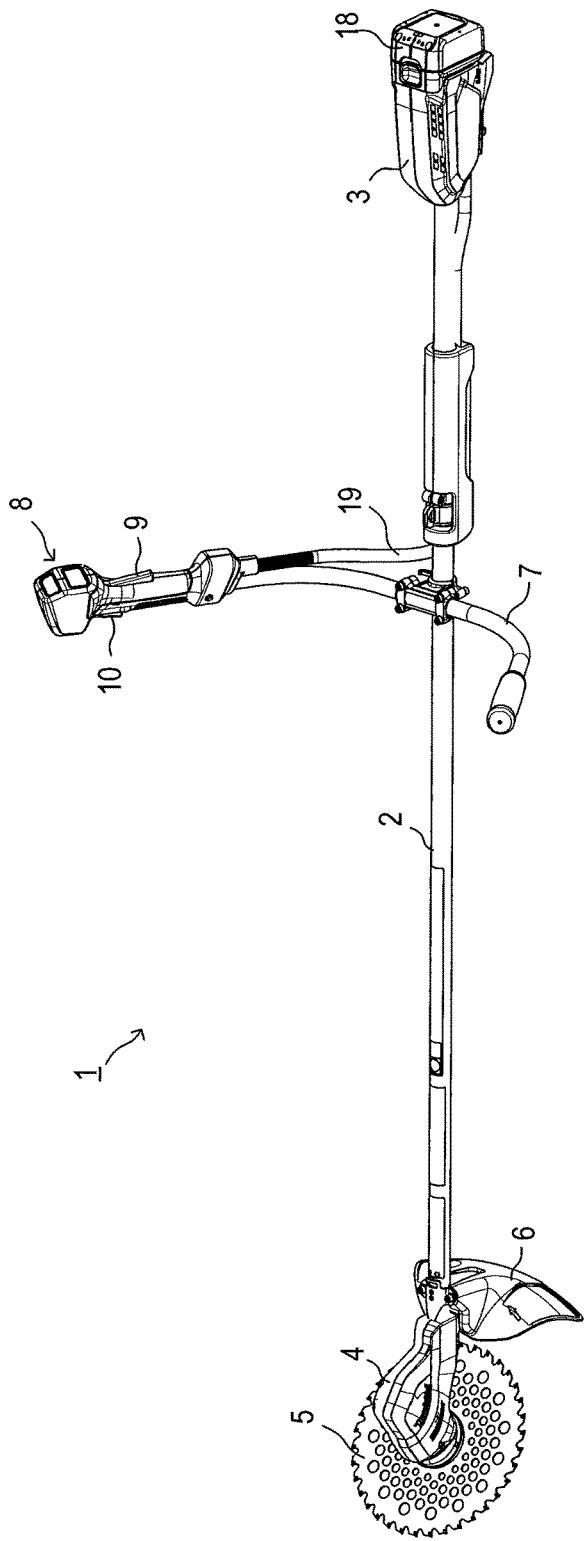
FIG. 1 is a perspective view showing an appearance of a grass cutter according to a first embodiment.

As shown in FIG. 1, a grass cutter 1 of the present embodiment comprises a main pipe 2, a control unit 3, a drive unit 4, and a handle 7. The main pipe 2 is formed in a long and hollow bar shape. The control unit 3 is provided at a rear end of the main pipe 2, and the drive unit 4 is provided at a front end of the main pipe 2.

A rotary blade 5 is attached to the drive unit 4 in a detachable and rotatable manner. The rotary blade 5 is configured to cut an object to be cut such as grass and small diameter wood. The rotary blade 5 shown in FIG. 1 is a so-called chip saw.

In other words, the rotary blade 5 is made of metal and has a disk-like shape. Saw bladed teeth are formed over the entire outer periphery of the rotary blade 5. A rigid chip is attached to a tip of each tooth.

A cover 6 is provided on a front end side of the main pipe 2. The cover 6 is provided to inhibit grass or the like cut by the rotary blade 5 from flying toward an operator.

Figure 2:
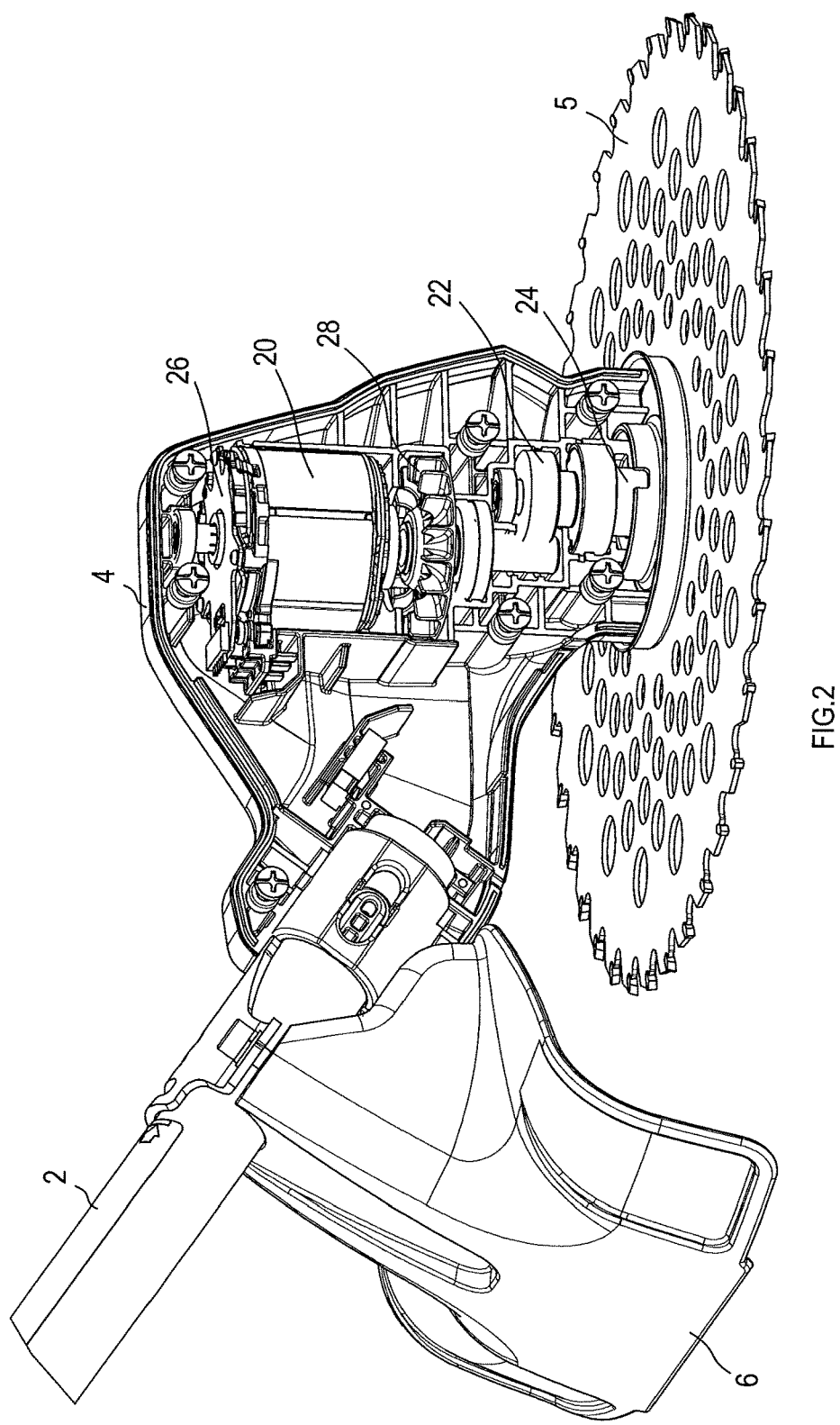
FIG. 2 is a cross-sectional view showing an internal configuration of a front end portion of the grass cutter.

As shown in FIG. 2, a motor 20 as a drive source for rotating the rotary blade 5 is mounted inside the drive unit 4. A gear mechanism 22 for deceleration is provided at a tip end of a rotation shaft of the motor 20. The rotary blade 5 is detachably mounted on an output shaft 24 of the gear mechanism 22. Therefore, when the motor 20 rotates, its rotational force is transmitted to the output shaft 24 via the gear mechanism 22, and the output shaft 24 rotates together with the rotary blade 5.

The motor 20 of the present embodiment is a three-phase brushless motor. A sensor substrate 26 is provided on a rear end side of the motor 20. An angle sensor 27 (see FIG. 3) for detecting a rotation angle of the motor 20 is attached to the sensor substrate 26.

In the present embodiment, the angle sensor 27 is a Hall sensor that uses a Hall element. A detection signal output from the angle sensor 27 is input to a control circuit 30 (see FIG. 3) in the control unit 3.

A fan 28 that generates cooling air by rotation of the motor 20 for cooling the motor 20 is provided on the rotation shaft of the motor 20. When the motor 20 rotates in a forward direction to cut the object, the fan 28 takes in an outside air into the drive unit 4 via the main pipe 2, and generates cooling air for cooling the motor 20.

The handle 7 is coupled to the main pipe 2 near an intermediate position in a longitudinal direction of the main pipe 2. The handle 7 is for the operator to grip when using the grass cutter 1 to perform grass cutting work. In the present embodiment, the handle 7 is provided with a so-called U-shaped handle having a grip at each end. The handle 7 may be another handle such as a loop handle.

On one grip of the handle 7, an operation/display unit 8 is provided for allowing the operator to operate with a finger and check an operation state.

Figure 3:
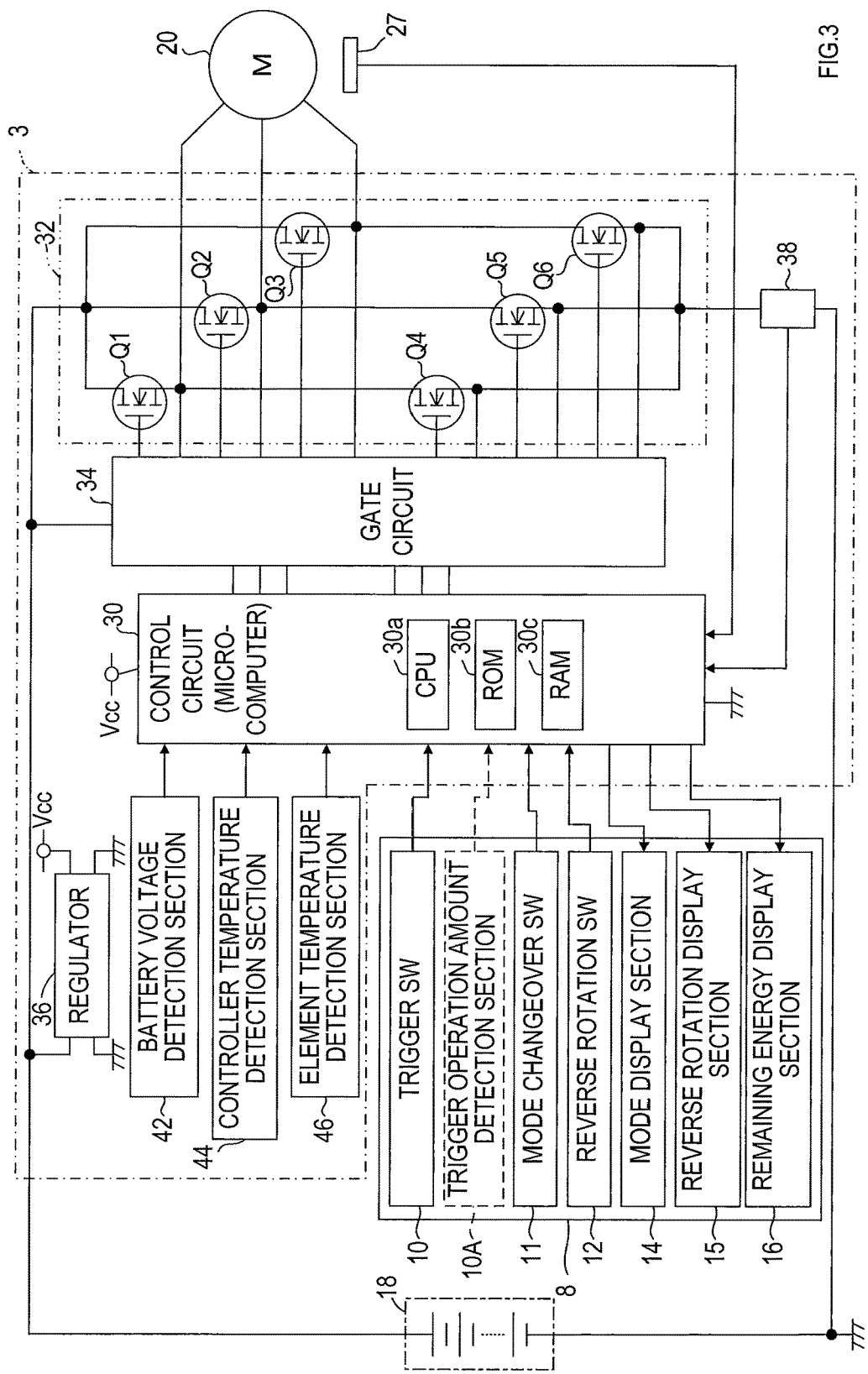
FIG. 3 is a block diagram showing an electrical configuration of the grass cutter.

As shown in FIG. 3, the operation/display unit 8 comprises a trigger switch 10, a mode changeover switch 11, a reverse rotation switch 12, a mode display section 14, a reverse rotation display section 15, and a remaining energy display section 16.

The trigger switch 10 is an operation switch for inputting a drive command to the motor 20. The operation/display unit 8 is also provided with a lock off switch 9 (see FIG. 1). When the lock-off switch 9 is pressed down, the trigger switch 10 becomes operable. When the lock-off switch 9 is not pressed down, the trigger switch 10 becomes inoperable.

The mode changeover switch 11 is an operation switch for switching a rotation speed as a control target of the motor 20 (hereinafter referred to as target rotation speed) to three levels of high, medium, and low. The mode changeover switch 11 is an example of a speed setting unit of the present disclosure. Speed modes (high speed, medium speed, and low speed) set by the mode changeover switch 11 are displayed on the mode display section 14.

The reverse rotation switch 12 is an operation switch for switching a rotation direction of the motor 20 to the forward direction to cut an object or a reverse direction. When the rotation direction of the motor 20 is switched to the reverse direction by the reverse rotation switch 12, the reverse rotation display section 15 displays that the rotation direction has been switched to the reverse direction.

The remaining energy display section 16 displays an amount of energy remaining in a battery in a battery pack 18 (hereinafter referred to as "remaining energy"). The battery pack 18 is detachably attached to the control unit 3 and supplies direct current (DC) power to the control unit 3.

Each part of the above-described operation/display unit 8 is coupled to the control circuit 30 in the control unit 3 via a cable 19 (see FIG. 1). The control circuit 30 monitors an operation state of each of the switches 10 to 12 of the operation/display unit 8, and performs driving of the motor 20, setting of a target rotation speed, switching of the rotation direction of the motor 20, and the like.

In addition, the control circuit 30 performs display of an operation state (mode display, reverse rotation display, and remaining energy display) on each of the display sections 14 to 16 of the operation/display unit 8, or performs error indication, and the like on other display sections provided in the operation/display unit 8.

As shown in FIG. 3, the control unit 3, in addition to the control circuit 30, comprises a drive circuit 32 and a gate circuit 34 as a drive unit for supplying power to the motor 20 to rotate the motor 20.

The drive circuit 32 receives power supply from the battery pack 18 (more specifically, the battery in the battery pack 18), and directs current to each winding corresponding to each phase of the motor 20. The drive circuit 32 comprises a three-phase full bridge circuit having six switching elements Q1 to Q6. Each of the switching elements Q1 to Q6 of the drive circuit 32 is a MOSFET in this embodiment.

In the drive circuit 32, the switching elements Q1 to Q3 are provided as so-called high side switches between respective terminals U, V and W of the motor 20 and a power supply line coupled to a positive electrode of the battery pack 18.

The remaining switching elements Q4 to Q6 are provided as so-called low side switches between the respective terminals U, V and W of the motor 20 and a ground line coupled to a negative electrode of the battery pack 18.

The gate circuit 34 turns on or off each of the switching elements Q1 to Q6 in the drive circuit 32 in accordance with a control signal (in other words, a conduction command) output from the control circuit 30, whereby a current flows to each winding of the motor 20 to rotate the motor 20.

The control unit 3 also comprises a regulator 36 that receives power supply from the battery pack 18 and generates a constant power supply voltage Vcc (for example, DC 5 V) necessary for operating the control circuit 30, the operation/display unit 8, etc.

A current detection circuit 38 for detecting a value of a current flowing to the motor 20 is provided in a current path coupled between a negative electrode of the drive circuit 32 and the negative electrode of the battery pack 18. A current detection signal output from the current detection circuit 38 is input to the control circuit 30.

Further, the control unit 3 also comprises a battery voltage detection section 42 for detecting a value of a battery voltage, a controller temperature detection section 44 for detecting a temperature of the control circuit 30, and an element temperature detection section 46 for detecting a temperature of the drive circuit 32 (more specifically switching elements Q1 to Q6).

The detection signals output from respective detection sections 42, 44, and 46 are also input to the control circuit 30 together with detection signals output from the angle sensor 27 and the current detection circuit 38.

The control circuit 30 corresponds to an example of a control unit of the present disclosure, and comprises a microcomputer including a CPU 30a, a ROM 30b, a RAM 30c, and the like.

When the trigger switch 10 is operated to input the drive command to the motor 20, the control circuit 30 acquires a rotation position of the motor 20 and a current rotation speed (hereinafter referred to as an actual rotation speed) based on the detection signal from the angle sensor 27. Then, the control circuit 30 uses the acquired rotation position and actual rotation speed of the motor 20 so as to drive the motor 20 in a predetermined rotation direction in accordance with an input from the reverse rotation switch 12.

When the motor 20 is driven, the control circuit 30 sets a control amount of the motor 20 so that the actual rotation speed of the motor 20 becomes a target rotation speed set in accordance with an operation of the mode changeover switch 11. The target rotation speed is a rotation speed set in advance as high speed, medium speed or low speed in accordance with the speed mode switched by the operation of the mode changeover switch 11.

The control amount of the motor 20 is a drive duty ratio of a control signal (PWM signal) output to the gate circuit 34 to turn on or off the switching elements Q1 to Q6 constituting the drive circuit 32.

Figure 4:
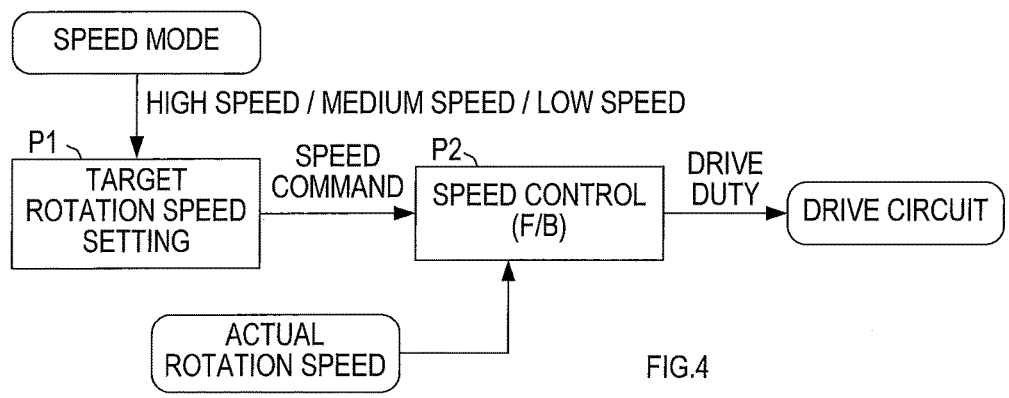
FIG. 4 is a block diagram showing a configuration of a motor control system.

That is, as shown in FIG. 4, the control circuit 30 sets the target rotation speed of the motor 20 in accordance with the speed mode (P1), and performs speed controls so that the actual rotation speed acquired from the detection signal from the angle sensor 27 becomes the set target rotation speed (P2). In this speed control, the drive duty ratio which is the control amount of the motor 20 is adjusted, so that feedback (F/B) control of the conduction current flowing to the motor 20 is performed.

Figure 5:
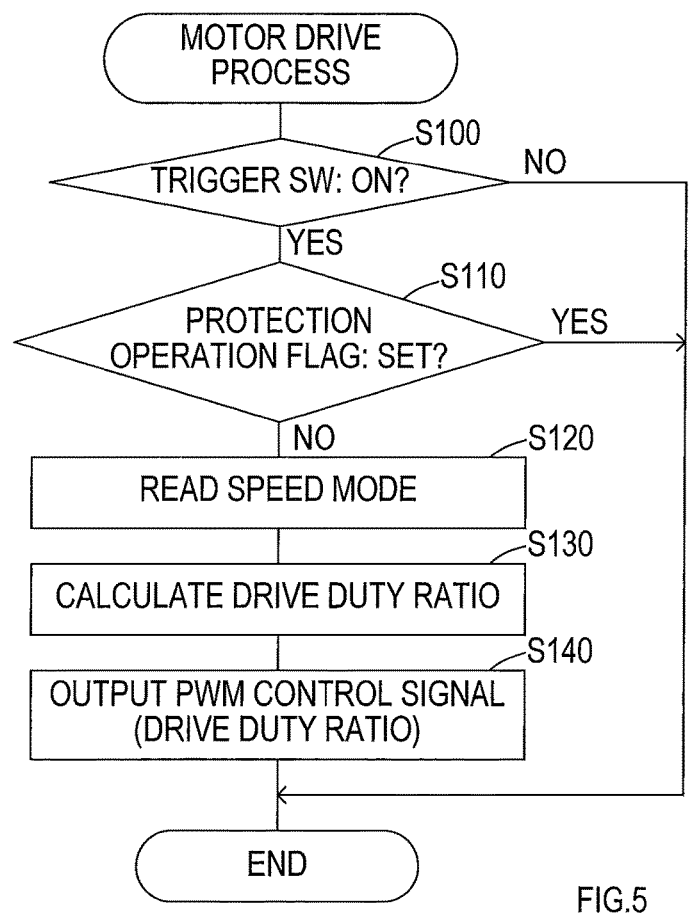
FIG. 5 is a flowchart showing a motor drive process performed by a control unit.

Therefore, in the control circuit 30, a motor drive process shown in FIG. 5 is repeatedly performed, as one of main routines.

As shown in FIG. 5, in the motor drive process, first in S100 (S represents a step), it is determined whether the trigger switch 10 is in an on state. If the trigger switch 10 is in the on state, the process proceeds to S110 to determine whether a protection operation flag is set.

The protection operation flag is set when an overload state of the motor 20 is detected in an overload protection process to be described later. If the protection operation flag is set in S110, the motor drive process ends in order to protect the motor 20. The motor drive process is also terminated when it is determined in S100 that the trigger switch 10 is in an off state.

If it is determined in S110 that the protection operation flag is not set, the process proceeds to S120 to read a currently set speed mode. The process proceeds to S130.

In S130, the drive duty ratio, which is the control amount of the motor 20, is calculated so that the actual rotation speed of the motor 20 becomes the target rotation speed corresponding to the speed mode.

Then, in subsequent S140, a control signal (PWM signal) corresponding to the drive duty ratio calculated in S130 is output to the gate circuit 34, so that the motor 20 is driven. The motor drive process ends.

As described above, in the present embodiment, the actual rotation speed of the motor 20 is feedback-controlled to one of the target rotation speeds of high speed, medium speed, and low speed corresponding to the speed mode. Here, when the motor 20 is driven, the motor 20 may be overloaded in some cases.

Figure 6:
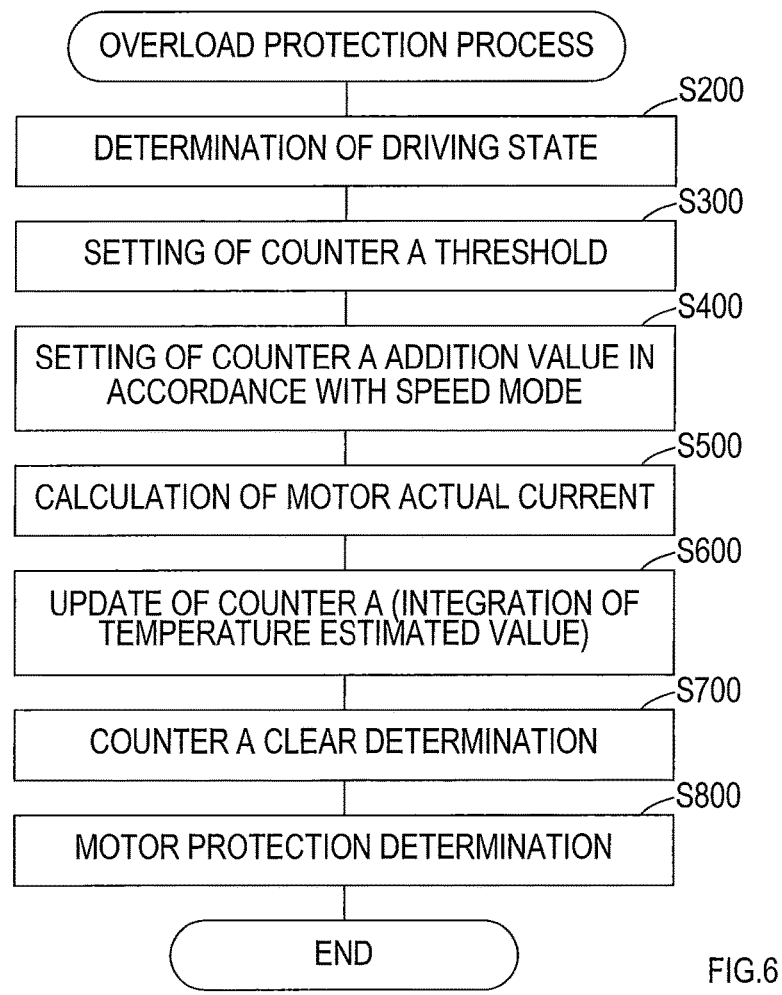
FIG. 6 is a flowchart showing an overload protection process performed by the control unit.
Figure 7A:
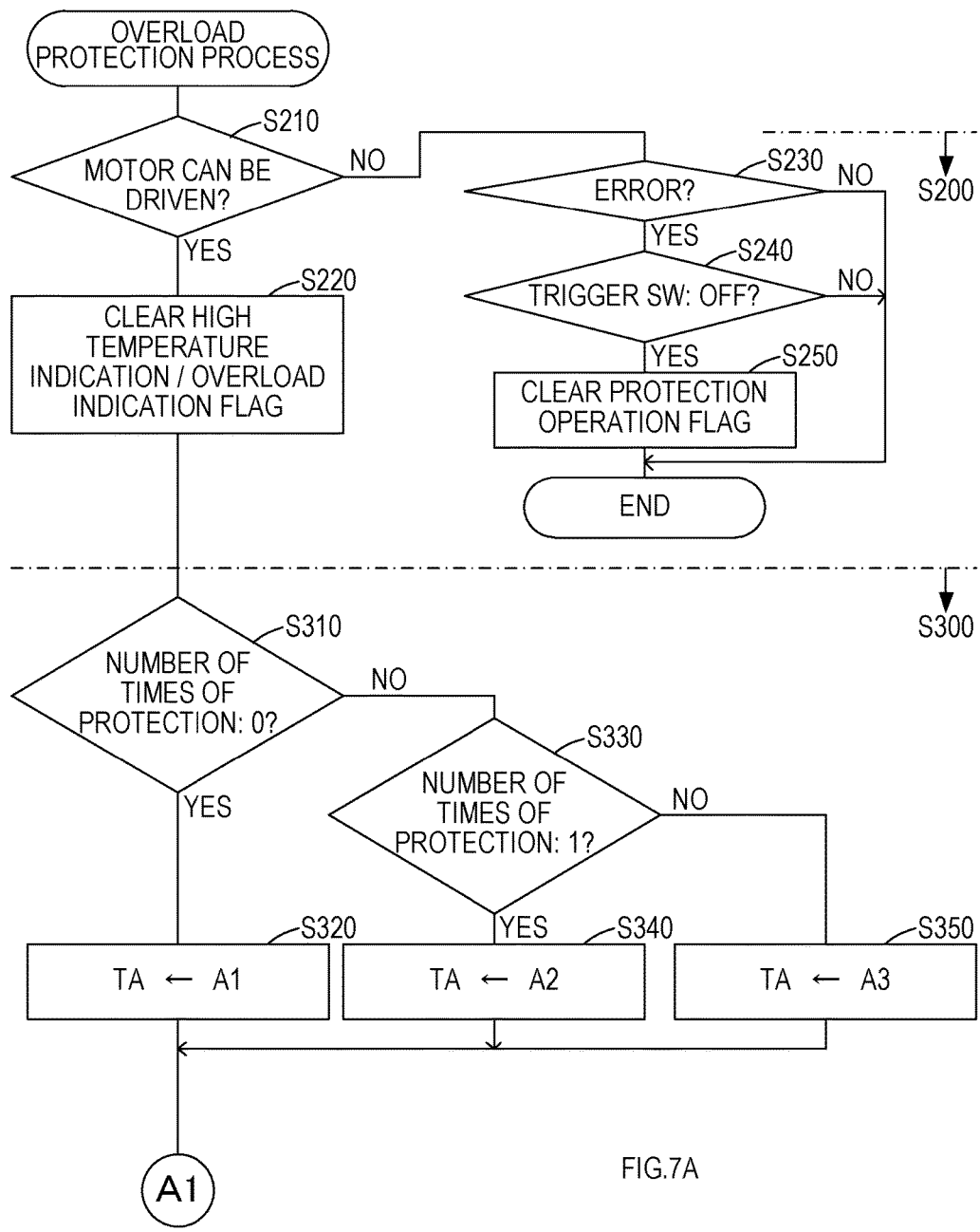
FIG. 7A is a flowchart showing details of a part of the overload protection process shown in FIG. 6.
Figure 7B:
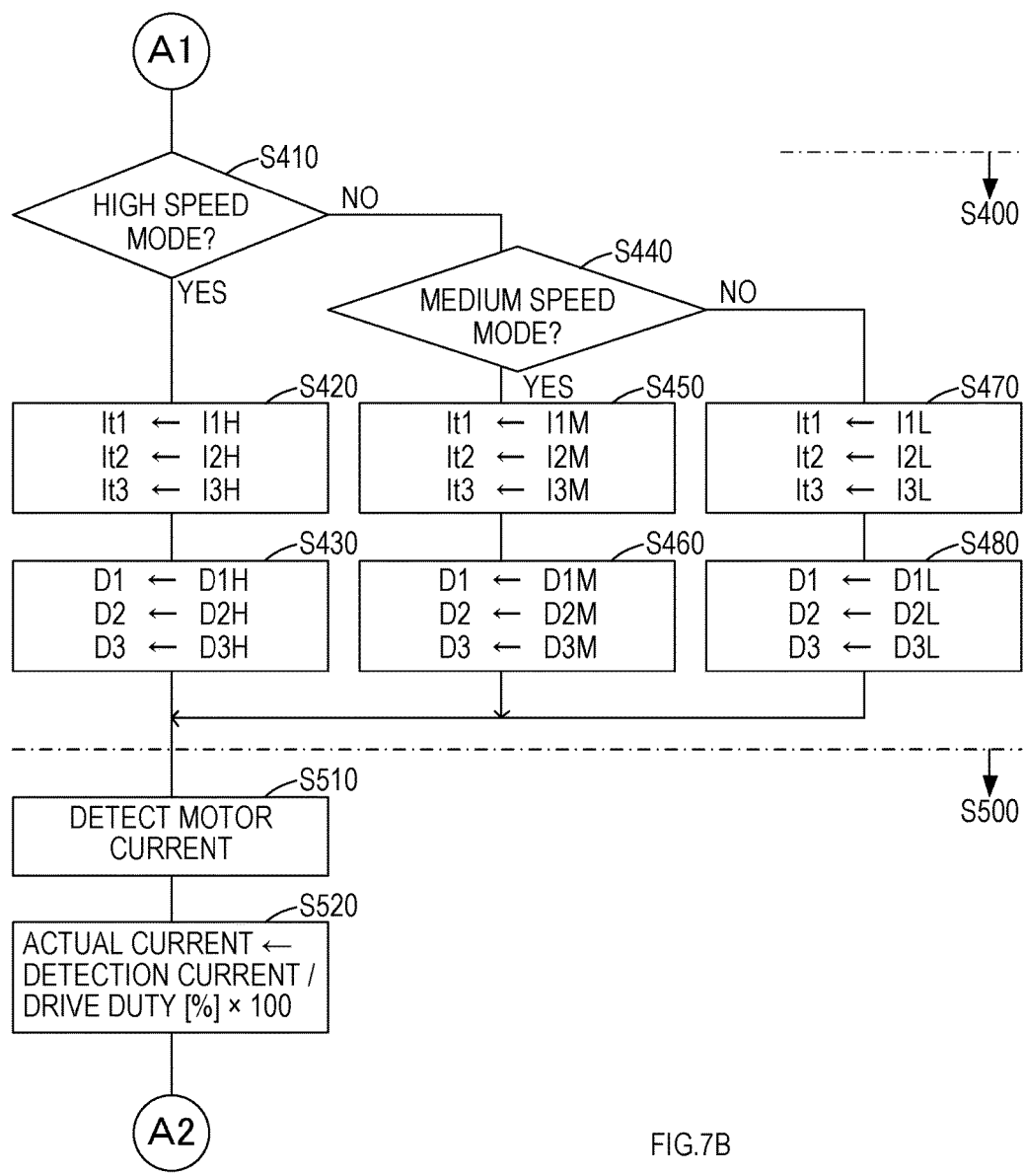
FIG. 7B is a flowchart showing details of another part of the overload protection process shown in FIG. 6.

Therefore, as one of the main routines, the control circuit 30 repeatedly performs the overload protection process shown in FIG. 6 in parallel with the motor drive process.

In this overload protection process, an estimated value of a heat generation amount of the motor 20 is calculated based on a value of a motor current detected through the current detection circuit 38 (hereinafter referred to as a detected value), and, when the estimated value (in other words, a value equivalent to the heat generation amount) reaches a predetermined threshold, it is determined that the motor 20 is overloaded, and driving of the motor 20 is stopped.

That is, as shown in FIG. 6, in the overload protection process, a driving state of the motor 20 is first determined in S200, and a threshold for overload determination with respect to a count value of a counter A used for estimating the heat generation amount of the motor 20 (that is, an estimated value of the heat generation amount) is set in S300. The counter A corresponds to an example of a heating counter of the present disclosure.

In S400, an addition value per one count of the counter A is set in accordance with the speed mode. In S500, a value of the current actually flowing to the winding of the motor 20 (hereinafter referred to as "actual current value") is calculated from a detection value detected via the current detection circuit 38.

Then, in S600, when the actual current value calculated in S500 is larger than a predetermined current threshold, the counter A is incremented based on a load state determined by the actual current value and the current threshold and the addition value set in S400. That is, the estimated value of the motor 20 is sequentially integrated in accordance with the load state.

Further, in S700, the counter A clearing process is performed. The counter A clearing process is a process that increments a counter B for monitoring a heat dissipation state of the motor 20 when the actual current value calculated in S500 is equal to or less than the current threshold, and clears the counter A based on a count value of the counter B. The counter B corresponds to an example of a heat dissipation counter of the present disclosure.

Finally, in S800, a motor protection determination process is performed. The motor protection determination process compares the count value of the counter A with the threshold set in S300. When the count value of the counter A is larger than the threshold, the motor protection determination process determines that the motor 20 is overloaded, and sets a flag. After the motor protection determination process is performed, the overload protection process is once terminated.

Hereinafter, with reference to FIGS. 7A, 7B, 8A, and 8B, processing operations performed in the above S200 to S800 will be described in detail.

First, a driving state determination process of S200 shown in FIG. 6 will be described in detail. The driving state determination process of S200 corresponds to processing of S210 to S250 shown in FIG. 7A. First, in S210, it is determined whether the motor 20 can be driven. In S210, when no error is detected in various error determination processes and the trigger switch 10 is in the on state, it is determined that the motor 20 can be driven.

If it is determined in S210 that the motor 20 can be driven, the process proceeds to S220. If it is determined in S210 that the motor 20 cannot be driven, the process proceeds to S230.

In S230, it is determined whether any error is currently detected. If an error is detected, the process proceeds to S240 to determine whether the trigger switch 10 is in the off state.

In S240, when it is determined that the trigger switch 10 is in the off state, the process proceeds to S250. The protection operation flag is cleared, and the overload protection process is temporarily terminated.

Even if it is determined in S230 that no error has been detected, or it is determined in S240 that the trigger switch 10 is in the on state, the overload protection process is temporarily terminated.

In S220, a high-temperature indication flag, which will be described later, and an overload indication flag are cleared, and the process proceeds to a counter A threshold setting process of S300.

Next, the counter A threshold setting process in S300 shown in FIG. 6 will be described in detail. The counter A threshold setting process of S300 corresponds to processing of S310 to S350 shown in FIG. 7A. First, in S310, it is determined whether the number of times of protection in which the protection operation flag is set to protect the motor 20 is "0". If the number of times of protection is "0", a threshold TA of the counter A is set to a preset set value "A1" in S320. The process proceeds to the addition value setting process of S400.

If it is determined in S310 that the number of times of protection is not "0", the process proceeds to S330. It is determined whether the number of times of protection is "1". If the number of times of protection is "1", the threshold TA of the counter A is set to a preset set value "A2" in S340. The process proceeds to the addition value setting process of S400.

If it is determined in S330 that the number of times of protection is not "1" (that is, when the number of times of protection is "2" or more), the process proceeds to S350. The threshold TA of the counter A is set to a preset set value "A3", and the process proceeds to the addition value setting process of S400.

Among the set values "A1" to "A3", "A1" is set to be the largest value and "A3" the smallest. When the number of times of protection is large, the temperature of the motor 20 rises. Therefore, the set values "A1" to "A3" are set so as to enable earlier determination of the overload state of the motor 20 based on the count value of the counter A.

Next, the addition value setting process in S400 shown in FIG. 6 will be described in detail. The addition value setting process of S400 corresponds to processing of S410 to S480 shown in FIG. 7B. First in S410, it is determined whether the speed mode currently set as the target rotation speed of the motor 20 is the high speed mode.

If the speed mode is the high speed mode, the process proceeds to S420. Current thresholds It1, It2, and It3 are set to set values I1H, I2H, and I3H for high speed mode, respectively. In subsequent S430, the addition values D1, D2, D3 of the counter A are set to set values D1H, D2H, and D3H for high speed mode.

Figure 10:
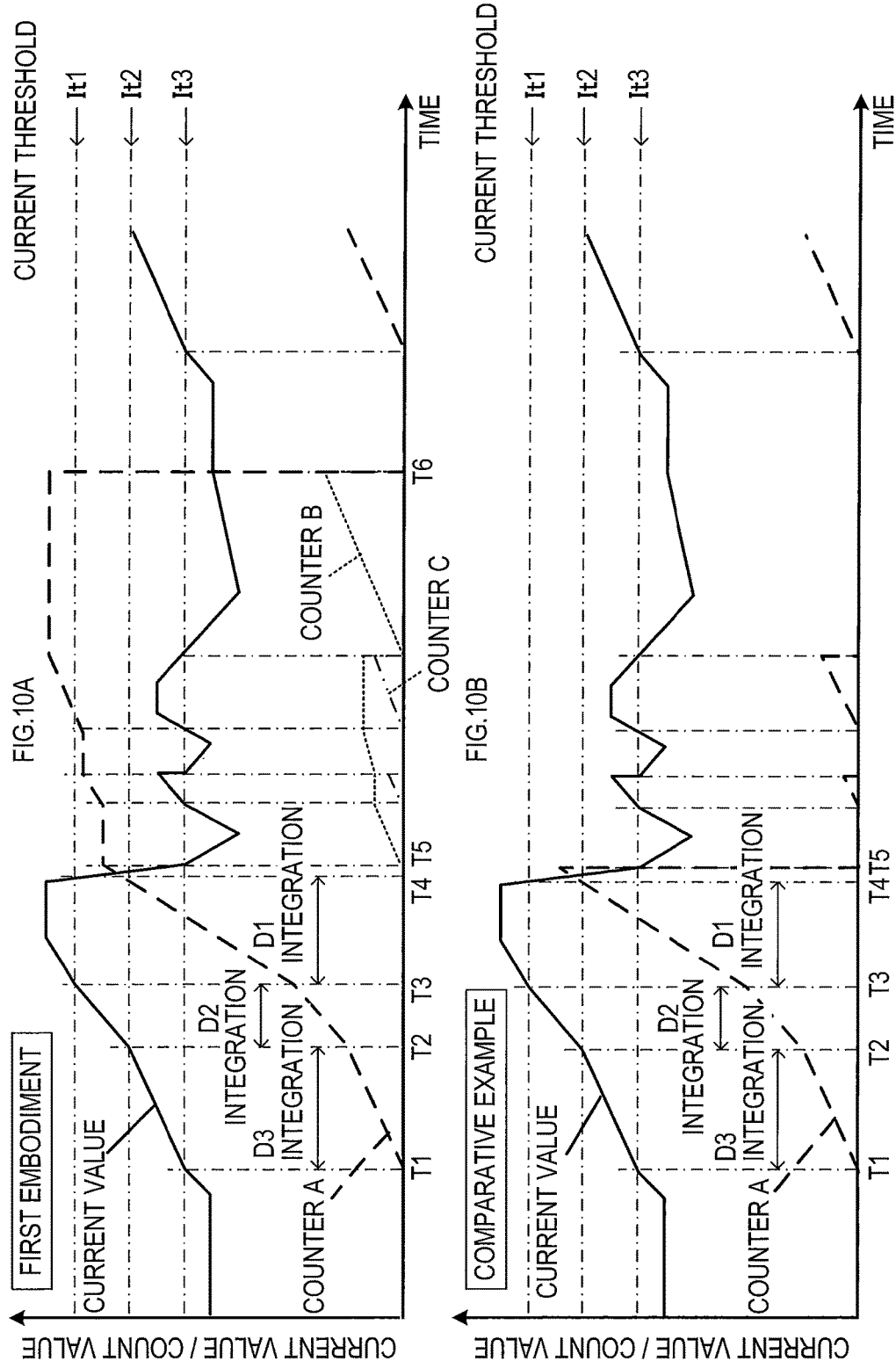
FIG. 10A is a time chart showing a relationship between changes in motor current and a counter for estimating heat generation amount according to the first embodiment.
FIG. 10B is a time chart showing a relationship between changes in motor current and a counter for estimating heat generation amount according to the related art.

As shown in FIG. 10A, the current thresholds It1, It2, and It3 are used to set an integration area of each of D1, D2, and D3 so that the larger the current value flowing to the motor 20 is, the larger the addition values D1, D2, and D3 to be added to the counter A become.

As is apparent from FIG. 10A, among the current thresholds It1, It2, and It3, It1 is set to be the largest value, and It3 is set to be the smallest value. Among the addition values D1, D2, and D3, D1 is set to be the largest value and D3 is set to be the smallest value.

In the high speed mode, the motor 20 rotates at a high speed, and a rate of temperature rise of the motor 20 is smaller than in the medium speed mode or the low speed mode. Therefore, the current thresholds It1, It2, and It3 in the high speed mode are set so that the count value of the counter A hardly increases as compared with cases in the medium speed mode or the low speed mode. That is, the set values I1H, I2H, and I3H of the current thresholds It1, It2, It3 are set to be values larger than set values of the medium speed mode and the low speed mode, which will be described later.

If it is determined in S410 that the speed mode is not the high speed mode, the process proceeds to S440. It is determined whether the currently set speed mode is the medium speed mode.

If the speed mode is the medium speed mode, the process proceeds to S450. The current thresholds It1, It2, and It3 are set to set values I1M, I2M, and I3M for medium speed mode, which are smaller than the set values for high speed mode, respectively.

In subsequent S460, the addition values D1, D2, and D3 of the counter A are set to set values D1M, D2M, and D3M for medium speed mode, which are larger than the set values for high speed mode, respectively.

In S440, when it is determined that the speed mode is not the medium speed mode (that is, the low speed mode), the process proceeds to S470. The current thresholds It1, It2, and It3 are set to set values I1L, I2L, and I3L for low speed mode, which are smaller than the set values for medium speed mode, respectively.

In subsequent S480, the addition values D1, D2, and D3 of the counter A are set to set values D1L, D2L, and D3L for low speed mode, which are larger than those of the medium speed mode respectively.

Here, the current thresholds It1, It2, and It3 are set so that the current thresholds It1, It2, and It3 become smaller as the target rotation speed becomes lower (procedure I), and the addition values D1, D2, and D3 are set so that the addition values D1, D2, and D3 become larger as the target rotation speed becomes lower (procedure II). However, it is not always necessary to perform both the procedures I and II. For example, in a case of performing the procedure I, the current threshold It1 in each speed mode is set such that the respective differences between the current threshold It1 in the low speed mode, the current threshold It1 in the medium speed mode, and the current threshold It1 in the high speed mode become relatively large, and the current thresholds It2 and It3 in each speed mode are set in the same manner as the current thresholds It1. In this way, the procedure II may not be performed. Likewise, only the procedure II may be performed, and the procedure I may not be performed. FIG. 17A shows examples of the current thresholds It1, It2, and It3 and the addition values D1, D2, and D3 set for each speed mode, in a case of performing only the procedure I. Here, the current thresholds It1, It2, and It3 are set so as to satisfy the conditions of I3H>I1M and I3M>I1L, so that the range of the current thresholds (It1 to It3) for each speed mode does not overlap. However, the range of the current thresholds for each speed mode may partially overlap. For example, the current thresholds It1, It2, and It3 may be set so that the condition of I3H<I1M is satisfied. Similarly, the addition values D1, D2, and D3 may be set so that the range of the addition values (D1 to D3) per speed mode may also partially overlap.

Next, an actual current calculation process in S500 shown in FIG. 6 will be described in detail. The actual current calculation process of S500 corresponds to processing of S510 and S520 shown in FIG. 7B. First, in S510, the detection value is detected via the current detection circuit 38.

In subsequent S520, the actual current value is calculated by dividing the detection value detected in S510 by the drive duty ratio (hereinafter referred to as drive DUTY) of the motor 20 at that time. That is, the following equation is calculated: actual current value=detected value/drive DUTY [%]×100.

The reason for calculating the actual current value in this manner is that the detection value detected via the current detection circuit 38 is different from the actual current value. The detected value is a value of the current flowing through a conduction path (in other words, power supply path) coupled between the negative electrode of the battery pack 18 and the negative electrode of the drive circuit 32 of the motor 20.

Figure 11:
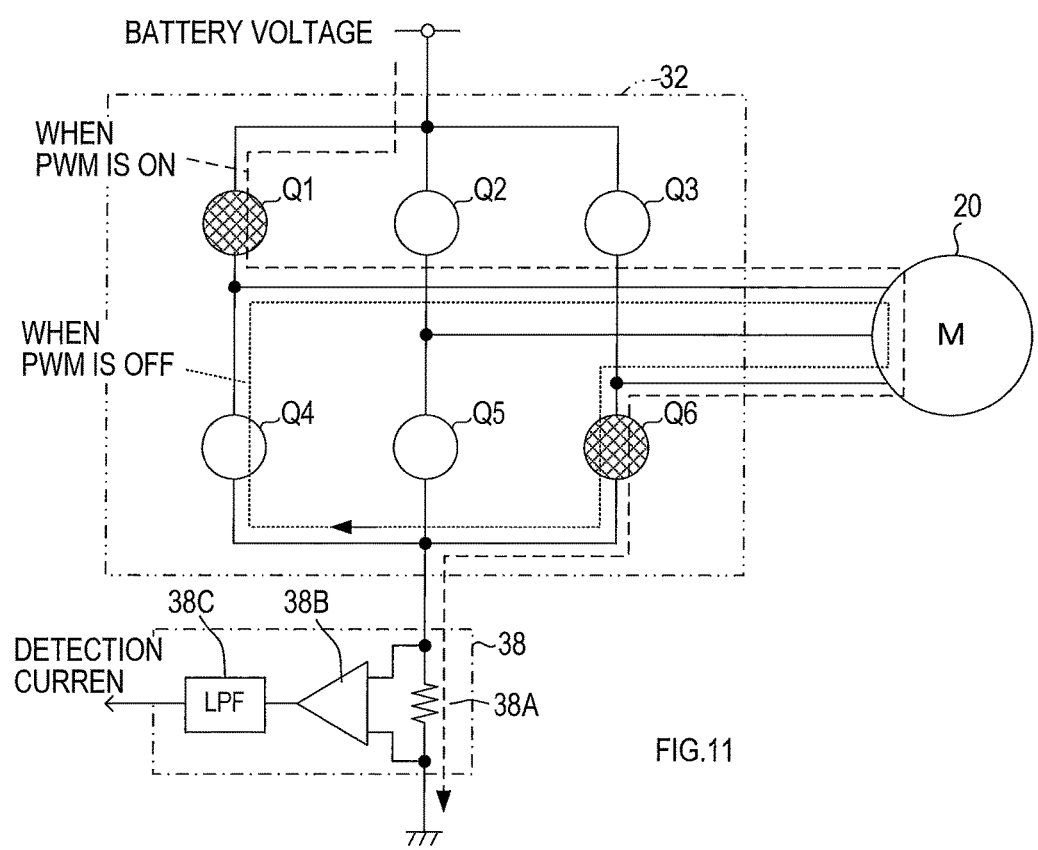
FIG. 11 is an explanatory diagram showing a path of a current flowing to the motor.

As shown in FIG. 11, the current detection circuit 38 usually comprises a resistor 38A provided in series with the conduction path described above, a current detection amplifier 38B that detects a value of voltage between both ends of the resistor 38A as a current value, and a low pass filter (LPF) 38C.

The low pass filter (LPF) 38C is used for smoothing a detection signal since the detection signal from the current detection amplifier 38B fluctuates in accordance with the drive DUTY.

Therefore, the detection value acquired via the current detection circuit 38 is a value of a current acquired by smoothing a current flowing through the resistor 38A when the PWM signal corresponding to the drive DUTY is on.

However, as shown in FIG. 11, not only when the PWM signal is on but also when the PWM signal is off, a current (so-called return current) flows through the motor 20. Then, the motor 20 generates heat by the current flowing even when the PWM signal is off.

Figure 12A:
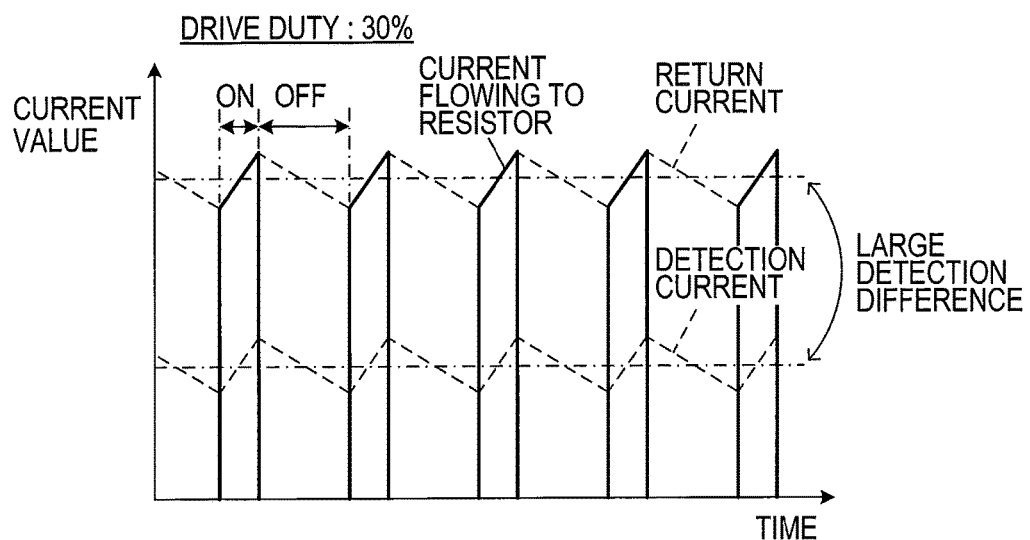
FIGS. 12A and 12B are explanatory diagrams for explaining difference between an actual current and a detected current produced by PWM control.
Figure 12B:
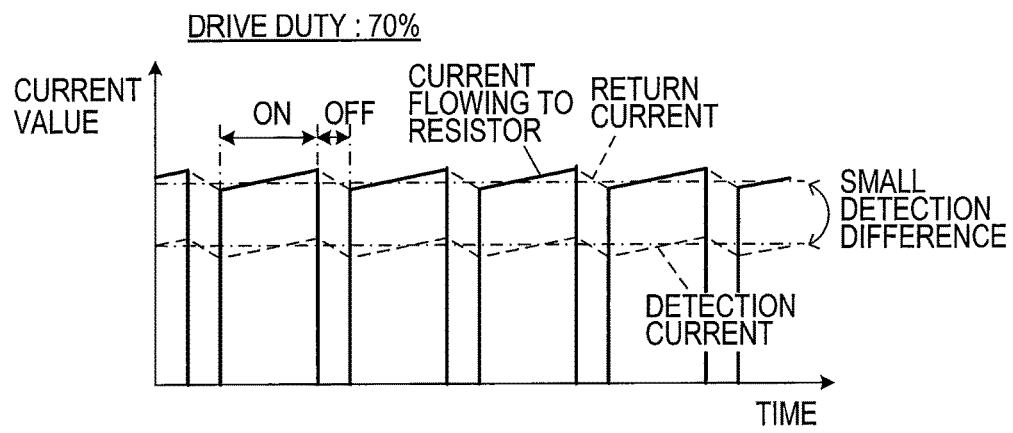

Also, as shown in FIGS. 12A and 12B, a conduction period of the current during which the detection value cannot be detected by the current detection circuit 38 varies with the drive DUTY, and becomes longer as the drive DUTY is smaller.

For this reason, a difference between the actual current value and the detected value greatly differs, for example, between when the motor 20 is driven by the drive DUTY 30% shown in FIG. 12A and when the motor 20 is driven by the drive DUTY 70% shown in FIG. 12B. That is, as the drive DUTY of the PWM signal decreases, a detection error included in the detection value increases.

Therefore, in the present embodiment, the actual current value is calculated from the detected value and the drive DUTY without using the detected value as the actual current value. As a result, the actual current value influencing the heat generation of the motor 20 is detected as the current value in which an influence of the drive DUTY of the PWM signal is inhibited.

Next, a counter A updating process in S600 shown in FIG. 6 will be described in detail. The counter A updating process of S600 corresponds to processing of S610 to S670 shown in FIG. 8A. First, in S610, it is determined whether an estimation condition for updating the counter A and estimating the heat generation amount of the motor 20 is satisfied.

This estimation condition is set as that, for example, a so-called soft start which gradually increases the rotation speed to a set driving speed ends after the start of driving of the motor 20, and a predetermined time (for example, 2 seconds) has elapsed after the start of driving of the motor 20.

That is, incrementing the counter A to estimate the heat generation amount is prohibited until the rotation of the motor 20 is stabilized after the start of driving of the motor 20.

Therefore, if it is determined in S610 that the estimation condition is not satisfied, the process proceeds to a clear determination process in S700 without performing subsequent processing. If it is determined in S610 that the estimation condition is satisfied, the process proceeds to S620.

In S620, it is determined whether the actual current value calculated in S500 is larger than the current threshold It1. If the actual current value is larger than the current threshold It1, the process proceeds to S630 to add the addition value D1 to the counter A. The process proceeds to the clear determination process of S700.

If it is determined in S620 that the actual current value is equal to or less than the current threshold It1, the process proceeds to S640 to determine whether the actual current value is larger than the current threshold It2. If the actual current value is larger than the current threshold It2, the process proceeds to S650 to add the addition value D2 to the counter A. The process proceeds to the clear determination process of S700.

If it is determined in S640 that the actual current value is equal to or less than the current threshold It2, the process proceeds to S660 to determine whether the actual current value is larger than the current threshold It3.

If it is determined in S660 that the actual current value is larger than the current threshold It3, the process proceeds to S670 to add the addition value D3 to the counter A, and proceeds to the clear determination process of S700.

If it is determined in S660 that the actual current value is equal to or less than the current threshold It3, the process proceeds to the clear determination process of S700 without updating the counter A (in other words, with the count value of the counter A being maintained).

As a result, in the counter A updating process of S600, as shown in FIG. 10A, the counter A is sequentially added with the addition value set to be a larger value as the value of the current flowing to the motor 20 increases.

Next, the clear determination process of the counter A of S700 shown in FIG. 6 will be described in detail. The clear determination process of the counter A of S700 corresponds to processing of S710 to S780 shown in FIG. 8A. First, in S710, it is determined whether the actual current value is equal to or less than the current threshold It3. If the actual current value is equal to or less than the current threshold It3, a counter C is cleared in S720 and then the counter B is incremented by adding a predetermined value "1" to the counter B in S730.

In subsequent S740, it is determined whether the value of the counter B incremented in S730 has become larger than a preset threshold TB.

When the value of the counter B is larger than the threshold TB, the counter A is cleared in S750, and the process proceeds to a motor protection determination process of S800. If the value of the counter B is less than or equal to the threshold TB, the process proceeds directly to the motor protection determination process in S800.

Here, the counter B is used to monitor the heat dissipation state of the motor 20, assuming that the motor 20 is dissipating heat when the actual current value is equal to or less than the current threshold It3 and the updating of the counter A is stopped.

In the present embodiment, when the value of the counter B reaches the threshold TB, it is determined that heat is sufficiently dissipated from the motor 20 and the counter A is cleared. As a result, estimation of the heat generation amount of the motor 20 by the counter A can be more accurately performed.

That is, in a case of estimating the heat generation amount of the motor 20 using the counter A, the counter A may be cleared when the value of the motor current becomes equal to or less than the current threshold It3 (time point T5), as shown in FIG. 10B, for example.

However, in this case, when the value of the motor current fluctuates around the current threshold It3, the counter A is frequently cleared and the heat generation amount of the motor 20 may not be able to be estimated.

In contrast, in the present embodiment, as shown in FIG. 10A, even if the value of the motor current becomes equal to or less than the current threshold It3, the count value of the counter A is maintained. When it is determined that heat is sufficiently dissipated from the motor 20 (time point T6) based on the count value of the counter B, the counter A is cleared. For this reason, better estimation of the heat generation amount using the counter A can be achieved.

When it is determined in S710 that the actual current value is larger than the current threshold It3, the process proceeds to S760 to increment the counter C by adding a predetermined value "1" to the counter C.

In subsequent S770, it is determined whether the value of the counter C incremented in S760 has become greater than a preset threshold TC. If the value of the counter C is equal to or less than the threshold TC, the process directly proceeds to the motor protection determination process of S800.

If the value of the counter C is larger than the threshold TC, the counter B is cleared in S780, and the process proceeds to the motor protection determination process of S800.

The counter C is used to clear the counter B. In the present embodiment, when the time during which the actual current value becomes larger than the current threshold It3 exceeds a set time corresponding to the threshold TC, the counter B is cleared.

The motor protection determination process of S800 shown in FIG. 6 will be described in detail. The motor protection determination process of S800 corresponds to processing of S810 to S860 shown in FIG. 8B. First in S810, it is determined whether the value of the counter A is larger than the threshold TA. If the value of the counter A is equal to or smaller than the threshold TA, it is determined that the motor 20 is normally operated and it is not necessary to protect the motor 20 from overload operation state. The overload protection process ends.

On the other hand, when the value of the counter A is larger than the threshold TA, the protection operation flag is set in S820 in order to protect the motor 20 from the overload operation state. As a result, driving of the motor 20 in the motor drive process is stopped, and the motor 20 is protected from overload operation state.

In S830, the number of times of protection is updated (incremented by 1), and it is determined in S840 whether the updated number of times of protection is not less than a preset threshold N.

If the number of times of protection is not equal to or larger than the threshold N, the overload indication flag is set in S860 and then the overload protection process is terminated. If the number of times of protection is equal to or larger than the threshold N, the overload protection process is terminated after the high temperature indication flag is set in S850.

That is, when the number of times of protection is not equal to or larger than the threshold N, it is determined that the temperature of the motor 20 has temporarily increased due to overload operation. By setting the overload indication flag, the overload operation state is displayed in a predetermined indication area of the operation/display unit 8 in a display process of FIG. 9.

On the other hand, when the number of times of protection is equal to or larger than the threshold N, it is determined that the temperature of the motor 20 is abnormally high due to overload operation. Then, by setting the high-temperature indication flag, it is displayed in the predetermined indication area of the operation/display unit 8 that the motor 20 has high temperature, in the display process of FIG. 9.

Next, the display process shown in FIG. 9 will be described. The display process shown in FIG. 9 is a process performed by the control circuit 30 as one of the main routines together with the above-described motor drive process and the overload protection process.

Figure 9:
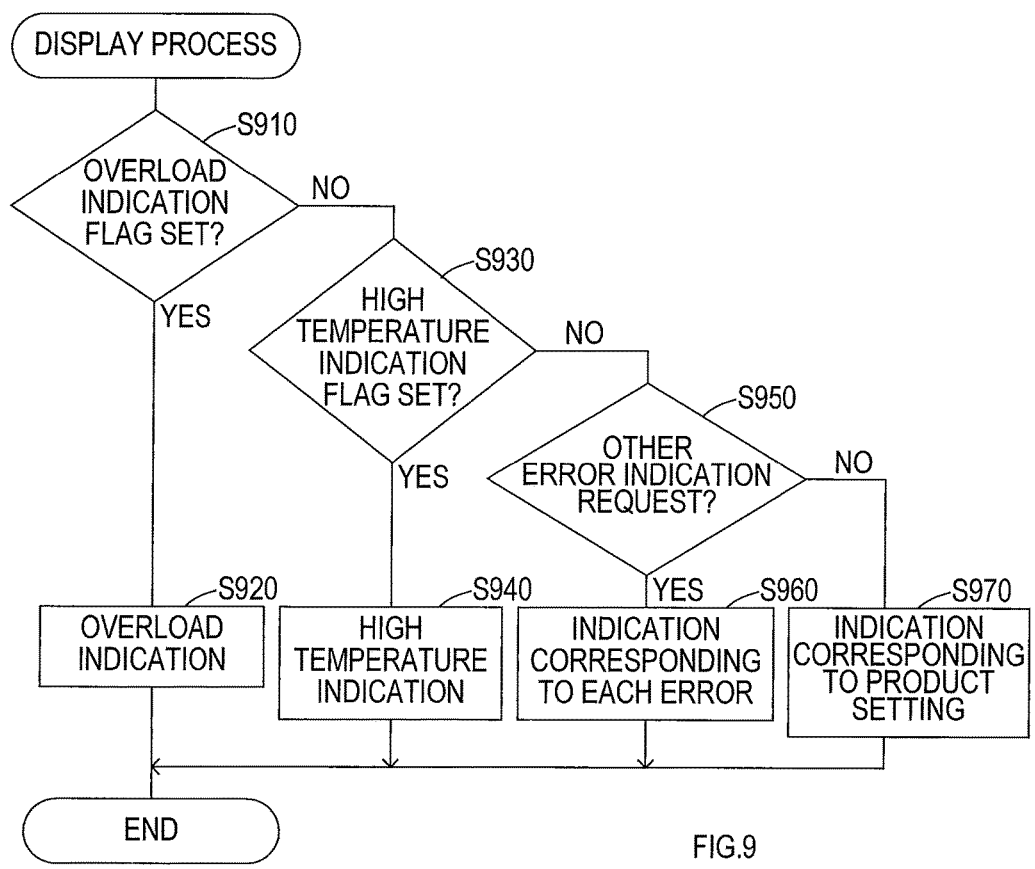
FIG. 9 is a flowchart showing a display process performed by the control unit.

As shown in FIG. 9, in the display process, it is determined whether the overload indication flag is set in S910. If the overload indication flag is set, it is displayed in the predetermined indication area of the operation/display unit 8 that the motor 20 is overloaded in S920.

If it is determined in S910 that the overload indication flag is not set, the process proceeds to S930 to determine whether the high temperature indication flag is set. If the high temperature indication flag is set, it is displayed in the predetermined indication area of the operation/display unit 8 that the motor 20 has high temperature in S940.

If it is determined in S930 that the high temperature indication flag is not set, the process proceeds to S950 to determine whether an error is detected in other error determination process and error indication is requested. If there is a request for error indication, the process proceeds to S960 to display an error corresponding to the indication request in a predetermined indication area of the operation/display unit 8.

If it is determined in S950 that no error indication is requested from other error determination process, the process proceeds to S970 to display information corresponding to product setting of the grass cutter 1 in the predetermined indication area of the operation/display unit 8.

As described above, in the grass cutter 1 of the present embodiment, the heat generation amount is estimated using the counter A based on the value of the current flowing to the motor 20, and, when the estimated value (count value) of the heat generation amount reaches the threshold TA, it is determined that the motor 20 is overloaded, and driving of the motor 20 is stopped. Therefore, the motor 20 can be protected from overload operation state.

Further, in the present embodiment, the addition value of the counter A, which is a parameter for estimating the heat generation amount, and the current threshold are set in accordance with the speed mode at the time of driving the motor 20, so that the value of the counter A reaches the threshold TA more quickly when the motor 20 rotates at a low rotation speed than at a high rotation speed.

Therefore, the heat generation amount of the motor 20 can be more properly estimated, and the overload operation of the motor 20 can be accurately detected based on the estimated value of the heat generation amount.

In addition, instead of using the detection value detected by the current detection circuit 38, the actual current value acquired by dividing the detection value by the drive DUTY of the motor 20 is used as the current value used for estimating the heat generation amount.

For this reason, the heat generation amount of the motor 20 can be estimated based on the value of the actual current actually flowing to the motor 20 (in other words, load applied to the motor 20). Also for this reason, accuracy of estimating the heat generation amount is improved and so the motor 20 can be well protected from overload operation state.

[Modification]

In the present embodiment, the heat generation amount of the motor 20 can be accurately estimated without being affected by the target rotation speed of the motor 20. Specifically, the addition value of the counter A, which is a parameter used for estimating the heat generation amount, and the current threshold are set in accordance with the speed mode.

However, the heat generation amount is for determining overload operation of the motor 20. Therefore, in order to properly determine overload operation, not the parameter used for estimating the heat generation amount but a threshold for overload determination may be set in accordance with the speed mode.

Figure 13:
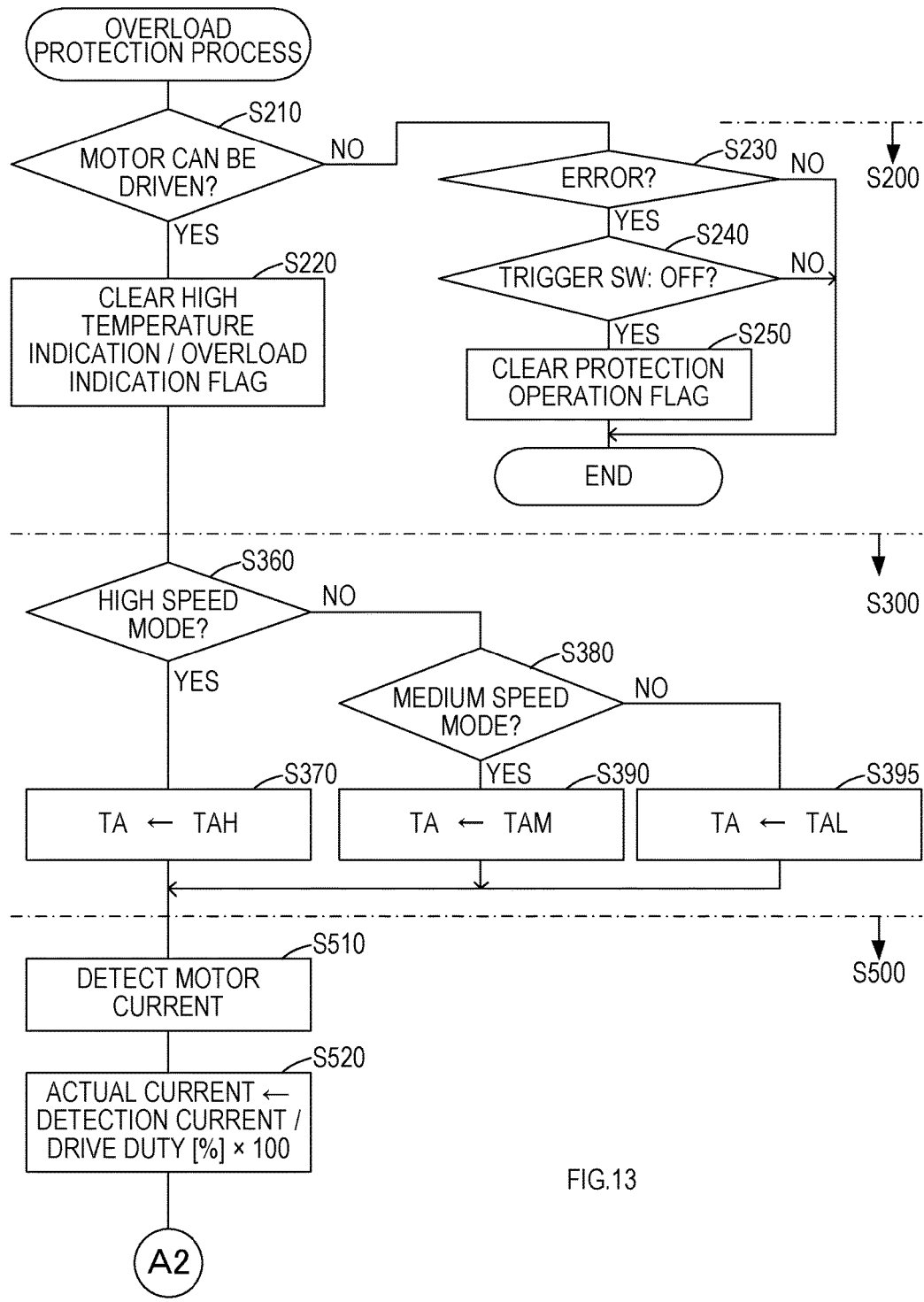
FIG. 13 is a flowchart showing a partial modification of the overload protection process.

For this purpose, for example, as shown in FIG. 13, the threshold setting process of S300 may be performed, and the addition value setting process of S400 may not be performed.

That is, the threshold setting process of S300 shown in FIG. 6 corresponds to processing of S360 to S395 of FIG. 13. First, in S360, it is determined whether the speed mode currently set as the driving speed of the motor 20 is the high speed mode. If the speed mode is the high speed mode, the process proceeds to S370 to set the threshold TA of the counter A to a threshold TAH for high speed mode.

If it is determined that the speed mode is not the high speed mode in S360, it is determined in S380 whether the speed mode is the medium speed mode. If the speed mode is the medium speed mode, the process proceeds to S390 to set the threshold TA of the counter A to a threshold TAM for medium speed mode.

If it is determined in S380 that the speed mode is not the medium speed mode, the process proceeds to S395, and sets the threshold TA of the counter A to a threshold TAL for low speed mode since the speed mode is the low speed mode.

The threshold TAH for high speed mode is larger than the thresholds TAM and TAL of the other modes, and the threshold TAL for low speed mode is set to a value smaller than the thresholds TAH and TAM of the other mode.

In this way, even if the current thresholds It1, It2, and It3 and the addition values D1, D2, and D3 do not change in accordance with the speed mode as in the above embodiment, the lower the driving speed of the motor 20 is, the more quickly the value of the counter A reaches the threshold TA. Thus, even in this case, overload operation of the motor 20 can be satisfactorily determined.

Further, in the present embodiment, the drive DUTY of the PWM control (in other words, the current flowing to the motor 20) is feedback-controlled so that the actual rotation speed of the motor 20 becomes the target rotation speed corresponding to the speed mode.

Figure 14:
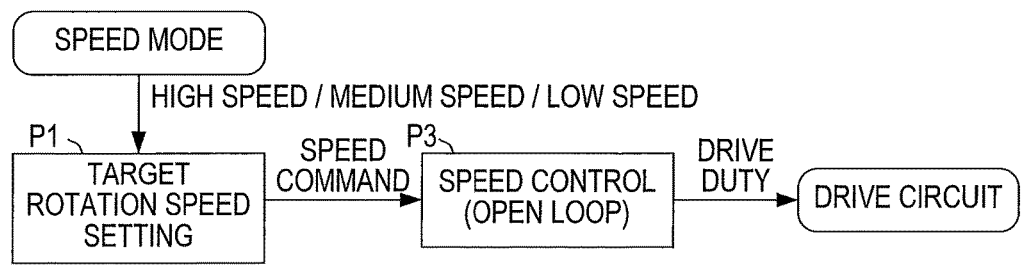
FIG. 14 is a block diagram showing another configuration example of the motor control system.

However, as shown in FIG. 14, the present disclosure can also be applied to an electric working machine that performs open loop control in the same manner as in the above embodiment, in which, when the target rotation speed is switched in accordance with the speed mode (P1), the motor 20 is driven with a constant drive DUTY corresponding to the speed command (P3).

In other words, in this case, in synchronization with switching the speed mode and outputting the control signal of the drive DUTY (PWM signal) corresponding to the speed mode as the conduction command, the threshold for overload determination with respect to the estimation value of the heat generation amount, or the parameter used for estimating the heat generation amount is switched.

In this way, as in the above-described embodiment, overload operation of the motor 20 can be appropriately determined from the estimated value of the heat generation amount of the motor 20 so that the motor 20 can be protected from overload operation state.

In the above-described embodiment, the actual current value is used to estimate the heat generation amount of the motor 20. However, since the heat generation amount of the motor 20 can be estimated if the load state of the motor 20 can be detected, it is not always necessary to use the actual current value.

For example, since the load state of the motor 20 can be detected from the drive DUTY of the motor 20 and the actual rotation speed of the motor 20, the heat generation amount of the motor 20 may be estimated based on the drive DUTY of the motor 20 and the actual rotation speed.

Further, in the above-described embodiment, driving of the motor 20 is stopped when overload operation of the motor 20 is detected. However, for example, the conduction current to the motor 20 may be reduced so as to inhibit the actual rotation speed of the motor 20. Also in this case, the motor 20 can be protected from overload operation state.

In the above embodiment, the counter is used for estimating the heat generation amount of the motor 20. However, it is not always necessary to use the counter. For example, the heat generation amount may be estimated by other methods, such as by integrating the detection signal from the current detection circuit 38, etc.

Second Embodiment

In the above embodiment and the modification, the target rotation speed of the motor 20 is set to one of high speed, medium speed, and low speed in accordance with the speed mode set via the mode changeover switch 11, and the motor 20 is driven in accordance with each target rotation speed.

However, as indicated by a dotted line in FIG. 3, the electric working machine such as the grass cutter 1 to which the present disclosure is applied may be provided with a trigger operation amount detection section 10A that detects a trigger operation amount which is a pulling amount of the trigger operation by the user, in addition to the trigger switch 10, and the target rotation speed of the motor 20 may be set in accordance with the trigger operation amount.

Figure 15:
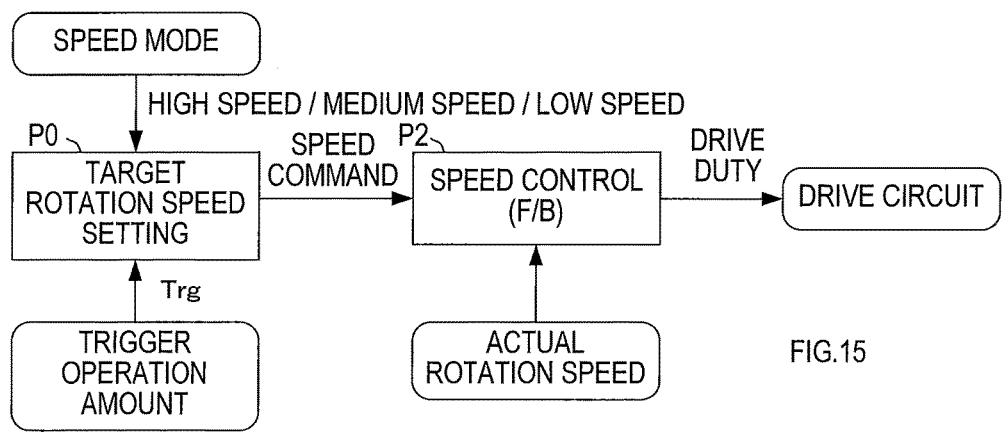
FIG. 15 is a block diagram showing a configuration of a motor control system according to a second embodiment.

In this type of electric working machine, as shown in FIG. 15, the control circuit 30 sets the target rotation speed corresponding to the trigger operation amount Trg with the rotation speed of high speed, medium speed, or low speed set in accordance with the speed mode as an upper limit (P0). For example, the target rotation speed is set by multiplying the upper limit speed of high speed, medium speed, or low speed by a ratio to the maximum value of the trigger operation amount Trg.

Then, the motor 20 is driven and controlled so that the actual rotation speed acquired from the detection signal from the angle sensor 27 becomes the set target rotation speed (P2).

Therefore, in this type of electric working machine, as in the first embodiment, if the current threshold It and the addition value D are set only in accordance with the speed mode, the counter A cannot be updated in accordance with the target rotation speed of the motor 20. Estimation accuracy of the heat generation amount may deteriorate in some cases.

Therefore, in the present embodiment, in the grass cutter 1 including a motor control system configured as shown in FIG. 15, the counter A addition value setting process in S400 of FIG. 6 is performed in accordance with the speed mode and the trigger operation amount, thereby inhibiting deterioration in estimation accuracy of the heat generation amount.

Figure 16:
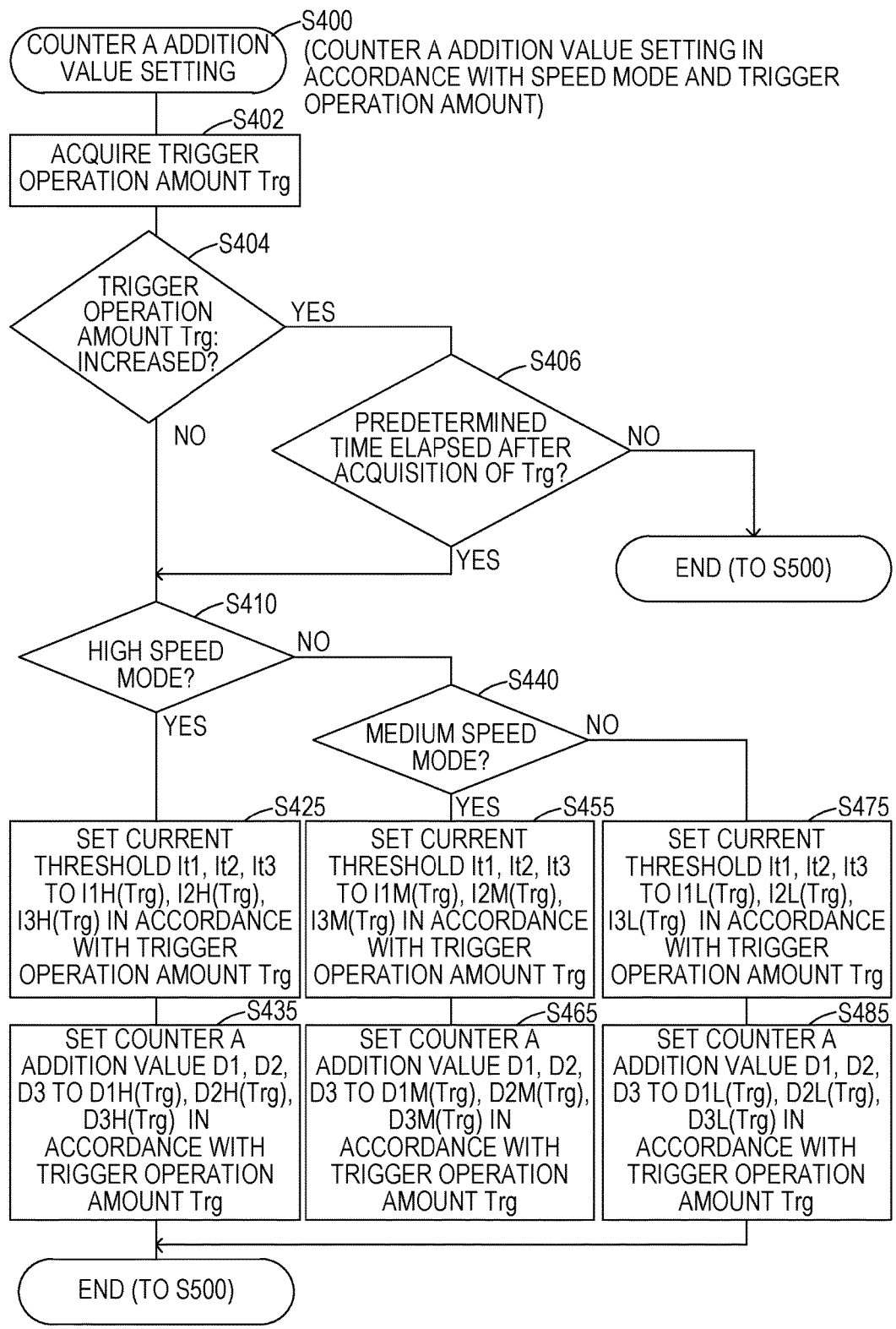
FIG. 16 is a flowchart showing a counter A addition value setting process.

As shown in FIG. 16, in the counter A addition value setting process of the present embodiment, first in S402, the trigger operation amount Trg is acquired from the trigger operation amount detection section 10A.

In S404, it is determined whether the trigger operation amount Trg acquired in S402 has increased from the trigger operation amount Trg used for setting the previous current threshold It and the addition value D. If the trigger operation amount Trg has not increased, the process proceeds to S410.

On the other hand, if the trigger operation amount Trg has increased, the process proceeds to S406 to determine whether a predetermined time has elapsed since the increased trigger operation amount Trg is acquired. If the predetermined time has elapsed, the process proceeds to S410. If the predetermined time has not elapsed, the counter A addition value setting process is terminated.

The reason why the determination in S406 is performed is that when the trigger operation amount Trg increases, the actual rotation speed of the motor 20 increases but it takes time to increase the actual rotation speed.

That is, if the current threshold It and the addition value D are updated in accordance with the trigger operation amount Trg immediately after the trigger operation amount Trg increases, it is conceivable that the temperature of the motor 20 is estimated to be lower than the actual temperature.

Therefore, in the present embodiment, when the trigger operation amount Trg increases, updating the current threshold It and the addition value D in accordance with the increase in the trigger operation amount Trg is delayed by a predetermined time.

In S410, it is determined whether the speed mode currently set as the target rotation speed of the motor 20 is the high speed mode.

If the speed mode is the high speed mode, the process proceeds to S425. The current thresholds are set to set values I1H (Trg), I2H (Trg), and I3H (Trg) for high speed mode It1, It2, and It3, respectively, in accordance with the trigger operation amount Trg acquired in S402.

In subsequent S435, the addition values D1, D2, and D3 to the counter A are set to set values D1H (Trg), D2H (Trg), and D3H (Trg) for high speed mode in accordance with the trigger operation amount Trg acquired in S402. After this setting, the counter A addition value setting process is terminated.

That is, in the present embodiment, as illustrated in FIG. 17B, for each speed mode of high speed, medium speed, and low speed, a set range of the current thresholds It1, It2, and It3 set and the addition values D1, D2, and D3 in accordance with the trigger operation amount Trg are stored in the memory (ROM 30b). Then, in the counter A addition value setting process, these values are set in accordance with the trigger operation amount Trg within the set range.

The current thresholds It1, It2, and It3 are set so as to decrease as the trigger operation amount Trg decreases (in other words, as the target rotation speed of the motor 20 decreases). Therefore, as the trigger operation amount Trg decreases, the counter A becomes more likely to be added. The temperature of the motor 20 can be properly estimated.

If it is determined in S410 that the speed mode is not the high speed mode, the process proceeds to S440 to determine whether the currently set speed mode is the medium speed mode.

If the speed mode is the medium speed mode, the process proceeds to S455. The current thresholds It1, It2, and It3 are set to set values I1M (Trg), I2M (Trg), and I3M (Trg) for medium speed mode, the maximum values of which are smaller than the corresponding set values for high speed mode respectively, in accordance with the trigger operation amount Trg.

In subsequent S465, the addition values D1, D2, and D3 to the counter A are set to set values D1M (Trg), D2M (Trg), and D3M (Trg) for medium speed mode, the maximum values of which are larger than the corresponding set values for high speed mode respectively, in accordance with the trigger operation amount Trg. The counter A addition value setting process is terminated.

In S440, if it is determined that the speed mode is not the medium speed mode (that is, the low speed mode), the process proceeds to S475. The current thresholds It1, It2, and It3 are set to set values I1L (Trg), I2L (Trg) and I3L (Trg) for low speed mode, the maximum values of which are smaller than the corresponding set values for medium speed mode, respectively, in accordance with the trigger operation amount Trg.

In subsequent S485, the addition values D1, D2, and D3 of the counter A are set to set values D1L (Trg), D2L (Trg), and D3L (Trg) for low speed mode, the maximum values of which are larger than the corresponding set values for medium speed mode, respectively, in accordance with the trigger operation amount Trg. The counter A addition value setting process is terminated.

Here, as in the first embodiment, both the above-described procedures I and II are performed. However, only one of the procedures I and II may be performed. FIG. 17B shows examples of the current thresholds It1, It2, and It3 and the addition values D1, D2, and D3 set per speed mode, in a case of performing only the procedure I.

According to the present embodiment, as shown in FIG. 18A, when the trigger operation amount Trg changes (time points T11 and T12), the current thresholds It1, It2, and It3 and the addition values D1, D2, and D3 also change. The counter A can be more optimally updated in accordance with the actual current value of the motor 20 and the target rotation speed.

Therefore, as shown in FIG. 18B, compared with the case where the current thresholds It1, It2, and It3 and the addition values D1, D2, and D3 are set only in accordance with the speed mode as in the first embodiment, the heat generation amount can be estimated more accurately.

Further, when the trigger operation amount Trg changes to increase (time point T12), the current thresholds It1, It2, and It3 and the addition values D1, D2, and D3 are updated as a predetermined time has elapsed (time T13).

Therefore, it can be inhibited that the current thresholds It1, It2, and It3 and the addition values D1, D2, D3 are updated when the actual rotation speed of the motor 20 does not increase in accordance with the increase of the trigger operation amount Trg, and that the temperature of the motor 20 is estimated to be lower than the actual temperature.

Also, when the trigger operation amount Trg decreases, updating of the current thresholds It1, It2, and It3 and the addition values D1, D2, and D3 is not delayed. Therefore, when the trigger operation amount Trg decreases and the actual rotation speed of the motor 20 decreases, occurrence of a delay in updating each of these values can be inhibited.

Therefore, according to the present embodiment, protection of the motor 20 from the temperature rise of the motor 20 can be more safely achieved.

[Modification]

In the present embodiment, the current thresholds It1, It2, and It3 and the addition values D1, D2, and D3 are set on the basis of the speed mode and the trigger operation amount Trg in the counter A addition value setting process. However, as shown in FIG. 19, these values may be set in accordance with a target rotation speed W of the motor 20.

Figure 19:
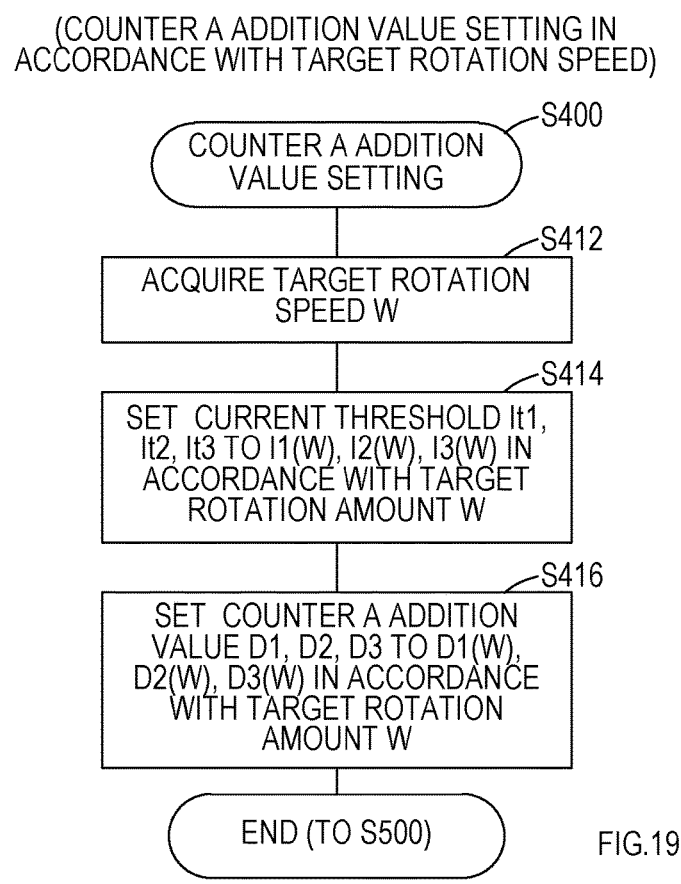
FIG. 19 is a flowchart showing a modification of the counter A addition value setting process.

That is, in the counter A addition value setting process shown in FIG. 19, first in S412, the target rotation speed W set based on the speed mode and the trigger operation amount Trg in the control system of the motor 20 shown in FIG. 15 is acquired.

In subsequent S414, the current thresholds It1, It2, and It3 are set to set values I1(W), I2(W), and I3(W) in accordance with the target rotation speed W acquired in S412.

In subsequent S416, the addition values D1, D2, and D3 to the counter A are set to set values D1(W), D2(W), and D3(W) in accordance with the target rotation speed W acquired in S412. After this setting, the counter A addition value setting process is terminated.

As described above, even if the current thresholds It1, It2, and It3 and the addition values D1, D2, and D3 are set in accordance with the target rotation speed W of the motor 20 in the counter A addition value setting process, the same effect as described above can be achieved by changing these values as shown in FIG. 18.

In the counter A addition value setting process shown in FIG. 19, when the target rotation speed W of the motor 20 increases, updating of the current thresholds It1, It2, and It3 and the addition values D1, D2, and D3 may be delayed for a predetermined time. In this way, the temperature of the motor 20 can be more accurately estimated and protection of the motor 20 from the temperature rise can be more safely achieved, as in the above embodiment.

Figure 8A:
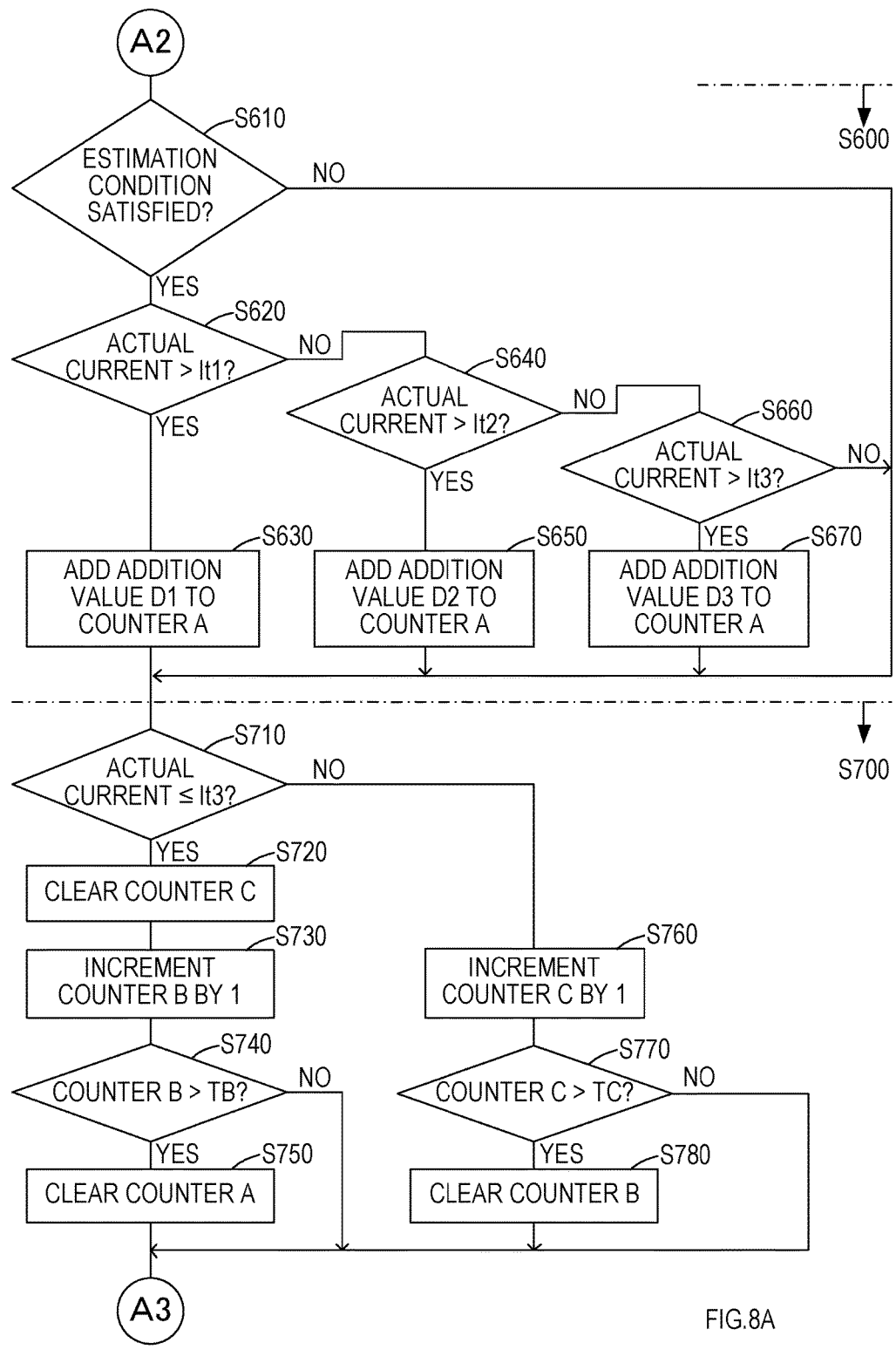
FIG. 8A is a flowchart showing details of another part of the overload protection process shown in FIG. 6.
Figure 8B:
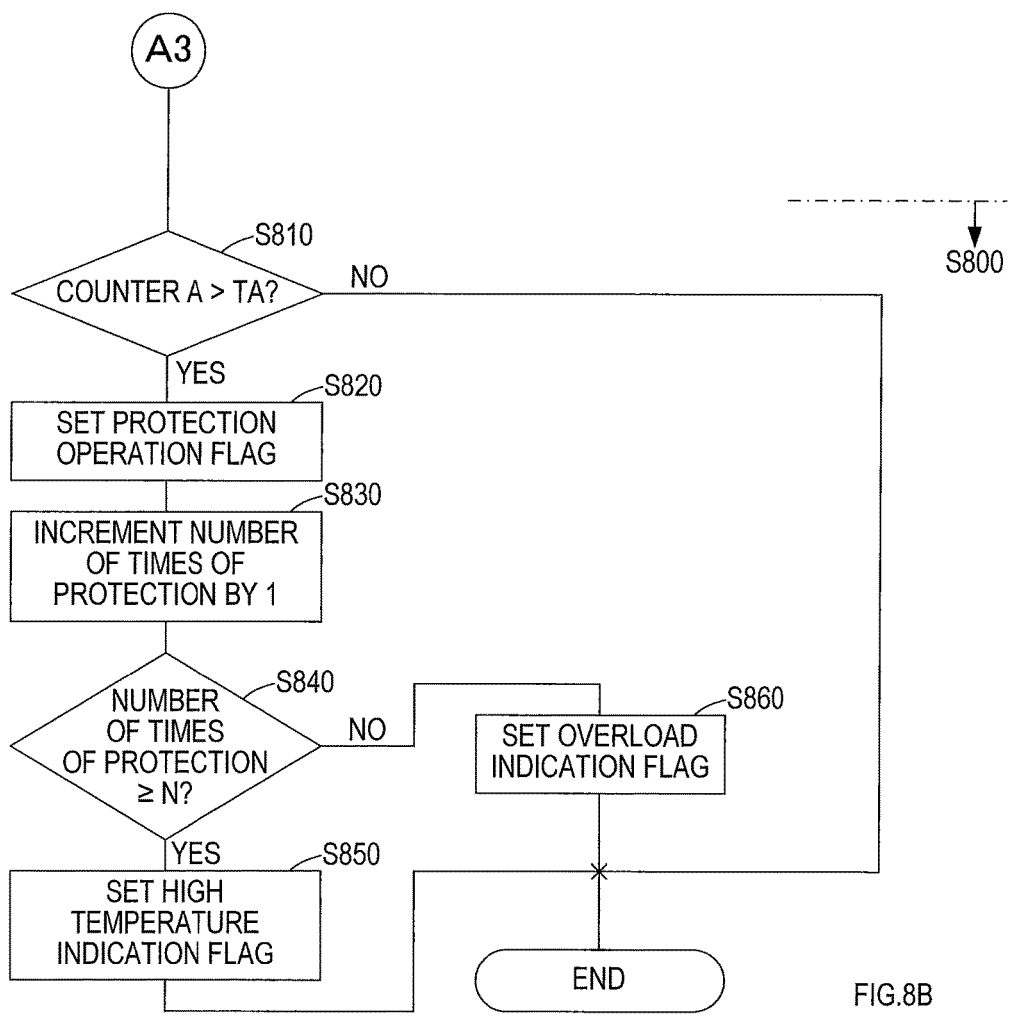
FIG. 8B is a flowchart showing details of the remaining part of the overload protection process shown in FIG. 6.

On the other hand, in the above description of the first embodiment, as shown in FIG. 8A, a timing to start incrementing the counter B in the counter A clear determination process performed in S700 of FIG. 6 is when the value of the current flowing to the motor 20 falls below the current threshold It3.

Therefore, as shown in FIG. 21A, incrementation of the counter B is started at the same timing (T5) as when incrementation of the counter A is stopped.

However, the motor 20 may not only have temperature rise or temperature drop due to heating or heat dissipation during current conduction but also may be maintained at a substantially constant temperature. In such a temperature maintaining period, updating of both the counter A and the counter B may be stopped.

Figure 20:
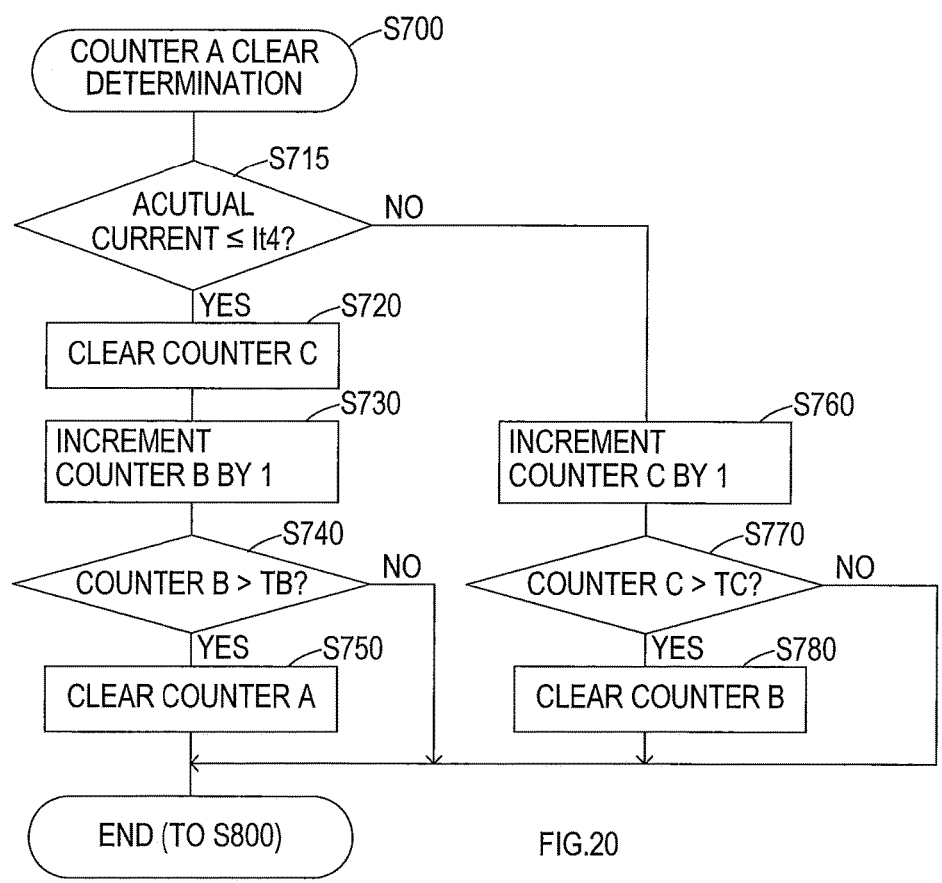
FIG. 20 is a flowchart showing a modification of a counter A clear determination process.
Figure 22:
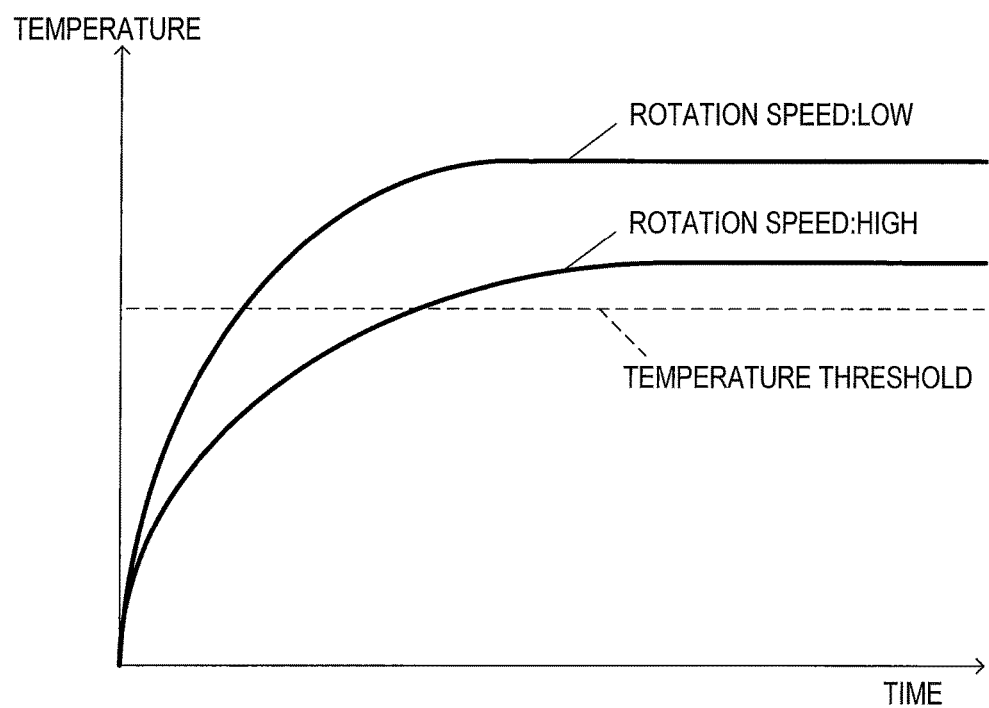
FIG. 22 is a time chart showing a relationship between a rotation speed and a temperature of the motor.

Therefore, in the counter A clear determination process shown in FIG. 8A, S715 may be performed instead of S710 as shown in FIG. 20 to determine whether the actual current value is equal to or less than a current threshold It4 that is set to be a value lower than the current threshold It3.

In this way, as shown in FIG. 21B, when the actual current value is between the current threshold It3 and the current threshold It4, the count values of both the counters A and B are maintained. When the actual current value becomes equal to or less than the current threshold It4 (time point T7), the counter B is incremented.

Therefore, in this case, it can be inhibited that the counter B is incremented during the temperature maintaining period of the motor 20 and that time until the counter A is cleared is shortened. The temperature of motor 20 can be more accurately estimated by the counter A.

In order for the count values of both the counters A and B to be maintained during the temperature maintaining period of the motor 20 as above, in S670 of the counter A updating process shown in FIG. 8A, the addition value D3 to be added to the counter A when it is determined that the actual current value becomes larger than the current threshold It3 may be set to 0.

Although the embodiments and modifications of the electric working machine according to the present disclosure have been described above, the electric working machine according to the present disclosure is not limited to the above-described embodiments, and can be variously modified.

For example, in the embodiments, the grass cutter 1 has been described as an example of the electric working machine according to the present disclosure, but an electric working machine having a motor as in the above embodiment can be applied in the same manner as the electric working machine according to the present disclosure. Specifically, the electric working machine of the present disclosure may be, for example, an electric saw with a rotary blade for cutting, an electric chain saw, or the like.

In addition, in the above embodiments, the control circuit 30 may comprise an individual combination of various electronic components instead of or in addition to a microcomputer, or may comprise an Application Specified Integrated Circuit (ASIC), an Application Specific Standard Product (ASSP), a programmable logic device such as a Field Programmable Gate Array (FPGA), or a combination thereof.

In addition, a plurality of functions included in one component in the above embodiments may be implemented by a plurality of components, or a single function of one component may be implemented by a plurality of components. In addition, a plurality of functions of a plurality of components may be implemented by one component, or one function implemented by a plurality of components may be implemented by one component. In addition, a part of the configuration of the above embodiments may be omitted. Further, at least a part of the configuration of the above embodiments may be added or replaced with the configuration of the other embodiment described above. It is to be noted that all aspects included in the technical concept specified only by the language described in the claims are embodiments of the present disclosure.

What is claimed is:

1. An electric working machine comprising:
   a motor configured to generate a driving force for driving a tool portion attached to the electric working machine;
   a drive circuit configured to drive the monitor;
   a speed setting unit configured to set a rotation speed of the motor;
   a load detection unit configured to detect a magnitude of a load on the motor;
   a determination unit configured to calculate an estimated value of a heat generation amount of the motor from the magnitude of the load detected by the load detection unit when the motor rotates, and to determine that the motor is in an overload operation state when the estimated value reaches a predetermined threshold; and
   a parameter setting unit configured to set a parameter used for calculating the estimated value in accordance with the rotation speed without being coupled to a detection circuit that detects a temperature of the motor and/or a temperature of the drive circuit, the parameter setting unit being further configured to set the parameter so that the estimated value quickly reaches the threshold as the rotation speed set by the speed setting unit decreases,
   wherein the load detection unit k configured to detect a current flowing through a conduction path provided between a power source and the motor,
   wherein the estimated value of the heat generation amount of the motor is based on the current detected by the load detection unit,
   wherein the determination unit includes a heating counter,
   wherein the parameter includes a count parameter for incrementing the heating counter,
   wherein the parameter setting unit is configured to set the count parameter to quickly increment the heating counter as the rotation speed set by the speed setting unit decreases,
   wherein the determination unit is configured to increment a count value of the heating counter based on the count parameter, and
   wherein the count value of the heating counter corresponds to the estimated value.

2. The electric working machine according to claim 1, further comprising:
   a motor protection unit configured to stop the motor and/or decelerate the motor when the determination unit determines that the motor is in the overload operation state.

3. The electric working machine according to claim 2, wherein the parameter setting unit is configured to set the threshold so that the threshold decreases as the operation of the motor protection unit increases.

4. The electric working machine according to claim 1, wherein the parameter setting unit is configured to set the threshold so that the estimated value rapidly reaches the threshold as the rotation speed decreases.

5. The electric working machine according to claim 1, wherein the parameter setting unit is configured to set the threshold so that the threshold increases as the rotation speed increases.

6. The electric working machine according to claim 1, wherein the parameter includes a heating addition value, wherein the parameter setting unit is configured to set the heating addition value so that the heating addition value increases as the rotation speed decreases,
   wherein the determination unit comprises a heating counter, and the determination unit is configured to increment the heating counter using the heating addition value set by the parameter setting unit when the magnitude of the load on the motor is higher than a predetermined set value, and
   wherein a count value of the heating counter corresponds to the estimated value.

7. The electric working machine according to claim 1, further comprising:
   a control unit configured to control rotation of the motor in accordance with the rotation speed set by the speed setting unit.

8. The electric working machine according to claim 7, wherein the electric working machine comprises a current path provided between a power source and the motor, wherein the load detection unit is configured to detect a value of a motor current flowing through the current path as the magnitude of the load on the motor, wherein the control unit is configured to PWM-control a conduction current to the motor in accordance with the rotation speed, wherein the determination unit is configured to (i) calculate a value of an actual current flowing to the motor by dividing the value of the motor current detected by the load detection unit by a drive duty ratio of the PWM control, and (ii) calculate the estimated value using the value of the actual current.

9. The electric working machine according to claim 7:

wherein the drive circuit is configured to supply power to the motor to rotate the motor, wherein the control unit is configured to output a conduction command in accordance with the rotation speed to the drive circuit to rotate the motor, wherein the parameter setting unit changes the parameter and/or the threshold in synchronization with the output of the conduction command to the drive circuit so that the estimated value quickly reaches the threshold as the rotation speed decreases.

10. The electric working machine according to claim 1, further comprising a cooling fan provided on a rotation shaft of the motor.

11. The electric working machine according to claim 1, wherein the parameter includes a set value, wherein the parameter setting unit is configured to set the set value so that the set value decreases as the rotation speed decreases, wherein the determination unit includes a heating counter, the determination unit being configured to increase a count value of the heating counter when the magnitude of the load on the motor is higher than the set value, and wherein the count value of the heating counter corresponds to the estimated value.

12. The electric working machine according to claim 1, wherein the parameter setting unit is configured to set the parameter in accordance with the rotation speed set by the speed setting unit and the magnitude of the load detected by the load detection unit.

13. The electric working machine according to claim 1, wherein the determination unit is configured to start calculating the estimated value when a soft start ends and when a predetermined time elapses after a start of driving of the motor, the soft start gradually increasing the rotation speed of the motor to the rotation speed set by the speed setting unit.

14. A method of detecting that a motor of an electric working machine is in an overload operating state, the method comprising:

setting a rotation speed of the motor;

detecting a magnitude of a load on the motor by detecting a current flowing through a conduction path provided between a power source and the motor;

calculating, with a heating counter, an estimated value of a heat generation amount of the motor based on the magnitude of the load, wherein the estimated value of the heat generation amount of the motor is based on the current flowing through the conduction path;

determining that the motor is in an overload operation state when the estimated value reaches a predetermined threshold; and setting a parameter used for calculating the estimated value based on the magnitude of the load in accordance with the rotation speed without being coupled to a detection circuit that detects a temperature of the motor and/or a temperature of the drive circuit, wherein the parameter is set so that the estimated value quickly reaches the threshold as the rotation speed decreases, wherein the parameter includes a count parameter for incrementing the heating counter, wherein setting a parameter used for calculating the estimated value based on the magnitude of the load in accordance with the rotation speed without being coupled to a detection circuit that detects a temperature of the motor and/or a temperature of the drive circuit includes setting the count parameter to quickly increment the heating counter as the set rotation speed decreases, wherein calculating, with a heating counter, an estimated value of a heat generation amount of the motor based on the magnitude of the load includes incrementing a count value of the heating counter based on the count parameter, and wherein the count value of the heating counter corresponds to the estimated value.

15. An electric working machine comprising;

a motor configured to generate a driving force for driving a tool portion attached to the electric working machine;

a speed setting unit configured to set a rotation speed of the motor;

a load detection unit configured to detect a magnitude of a load on the motor;

a determination unit configured to calculate an estimated value of a heat generation amount of the motor from the magnitude of the load detected by the load detection unit when the motor rotates, and to determine that the motor is in an overload operation state when the estimated value reaches a predetermined threshold; and a parameter setting unit configured to set a parameter used for calculating the estimated value and/or the threshold in accordance with the rotation speed set by the speed setting unit, wherein the load detection unit is configured to detect a current flowing through a conduction path provided between a power source and the motor, wherein the estimated value of the heat generation amount of the motor is based on the current detected by the load detection unit, wherein the parameter includes a heating addition value, wherein the parameter setting unit is configured to set the heating addition value so that the heating addition value increases as the rotation speed decreases, wherein the determination unit includes a heating counter, the determination unit being configured to increment the heating counter using the heat addition value set by the parameter setting unit when the magnitude of the load on the motor is higher than a predetermined set value, and wherein a count value of the heating counter corresponds to the estimated value.

16. The electric working machine according to claim 15, wherein the determination unit comprises a heat dissipation counter, and the determination unit is configured to stop incrementing the heating counter and increment the count value of the heat dissipation counter using a predetermined heat dissipation addition value when the magnitude of the load on the motor is lower than the set value, and clear the count value of the heating counter when a count value of the heat dissipation counter reaches a predetermined heat dissipation determination value.

17. The electric working machine according to claim 16, wherein the determination unit is configured to clear the count value of the heat dissipation counter when the magnitude of the load on the motor is higher than the set value continuously for a longer time than a predetermined determination time.

18. The electric working machine according to claim 16, wherein the determination unit increments the heat dissipation counter when the magnitude of the load on the motor is lower than a low set value that is lower than the set value, and stop incrementing the heating counter and the heat dissipation counter when the magnitude of the load on the motor is between the set value and the low set value.

19. The electric working machine according to claim 15, wherein the parameter includes the set value,
wherein the parameter setting unit is configured to set the set value so that the set value decreases as the rotation speed decreases.

\* \* \* \* \*